United States Patent
Wang et al.

(10) Patent No.: US 10,578,755 B2
(45) Date of Patent: Mar. 3, 2020

(54) SYSTEM AND METHOD FOR RECONSTRUCTED WAVEFIELD INVERSION

(71) Applicant: ION Geophysical Corporation, Houston, TX (US)

(72) Inventors: Chao Wang, Houston, TX (US); Howard David Yingst, Houston, TX (US)

(73) Assignee: Ion Geophysical Corporation

( * ) Notice: Subject to any disclaimer, the term of this patent is extended or adjusted under 35 U.S.C. 154(b) by 543 days.

(21) Appl. No.: 15/375,471

(22) Filed: Dec. 12, 2016

(65) Prior Publication Data

US 2017/0168177 A1 Jun. 15, 2017

Related U.S. Application Data

(60) Provisional application No. 62/266,516, filed on Dec. 11, 2015.

(51) Int. Cl.
  *G01V 1/06* (2006.01)
  *G01V 1/28* (2006.01)
  *G01V 1/36* (2006.01)

(52) U.S. Cl.
  CPC .............. *G01V 1/282* (2013.01); *G01V 1/36* (2013.01); *G01V 2210/614* (2013.01);
  (Continued)

(58) Field of Classification Search
  USPC .......................................................... 367/7
  See application file for complete search history.

(56) References Cited

U.S. PATENT DOCUMENTS

| | | | | |
|---|---|---|---|---|
| 4,953,142 A | * | 8/1990 | Rimmer | G01V 1/282 367/53 |
| 7,373,252 B2 | * | 5/2008 | Sherrill | G01V 1/30 702/17 |

(Continued)

FOREIGN PATENT DOCUMENTS

| | | |
|---|---|---|
| EP | 3073296 A1 | 9/2016 |
| GB | 2509223 A | 6/2014 |
| WO | 2015159151 A2 | 10/2015 |

OTHER PUBLICATIONS

Ma, Yong et al., "Full waveform inversion with image-guided gradient," Center for Wave Pheonomena, Colorado School of Mines, issue 651, 2010, pp. 141-154.

(Continued)

*Primary Examiner* — James R Hulka
(74) *Attorney, Agent, or Firm* — Dorsey & Whitney, LLP

(57) ABSTRACT

Computer systems and methods are provided for seismic wavefield processing, including time domain reconstructed full wavefield inversion (TDRFWI) of seismic survey data. Suitable methods include forward propagating a source signal based on a model of a subsurface region, generating a residual based on the forward-propagated wavefield in comparison to field data, back propagating the residual to generate a reconstructed source perturbation, and adding the reconstructed source perturbation to the source signal to generate a reconstructed source wavefield. The reconstructed source perturbation can be forward propagated to generate a reconstructed wavefield perturbation, and added to the reconstructed wavefield perturbation to reconstruct the wavefield. The propagations can be performed in the time domain, and the model can be updated based on the reconstructed wavefield and reconstructed source perturbation to generate high fidelity subsurface images.

20 Claims, 14 Drawing Sheets

(52) U.S. Cl.
CPC ............... *G01V 2210/6222* (2013.01); *G01V 2210/675* (2013.01); *G01V 2210/679* (2013.01)

(56) References Cited

U.S. PATENT DOCUMENTS

| | | | |
|---|---|---|---|
| 8,385,151 B2* | 2/2013 | Liu | G01V 1/28 367/50 |
| 8,773,951 B2* | 7/2014 | Shan | G01V 1/28 367/50 |
| 9,081,115 B2* | 7/2015 | Routh | G01V 1/28 |
| 9,158,018 B2* | 10/2015 | Fuck | G01V 1/301 |
| 9,201,153 B2* | 12/2015 | Fletcher | G01V 1/36 |
| 9,244,181 B2* | 1/2016 | Rickett | G01V 1/282 |
| 9,465,125 B2* | 10/2016 | Zhang | G01V 1/36 |
| 2007/0203673 A1* | 8/2007 | Sherrill | G01V 1/30 702/189 |
| 2010/0054082 A1* | 3/2010 | McGarry | G01V 1/28 367/53 |
| 2010/0118651 A1* | 5/2010 | Liu | G01V 1/282 367/50 |
| 2010/0302906 A1* | 12/2010 | Liu | G01V 1/28 367/59 |
| 2011/0085413 A1* | 4/2011 | Keers | G01V 1/282 367/21 |
| 2011/0090760 A1 | 4/2011 | Rickett et al. | |
| 2011/0317519 A1 | 12/2011 | Liu | |
| 2012/0236685 A1 | 9/2012 | Shan et al. | |
| 2012/0259601 A1* | 10/2012 | Fuck | G01V 1/301 703/2 |
| 2013/0107665 A1* | 5/2013 | Fletcher | G01V 1/36 367/43 |
| 2013/0343154 A1* | 12/2013 | Zhang | G01V 1/36 367/24 |
| 2014/0129479 A1* | 5/2014 | Warner | G01V 1/306 705/348 |
| 2015/0012256 A1* | 1/2015 | Routh | G01V 1/28 703/10 |
| 2016/0146961 A1* | 5/2016 | Ratcliffe | G06F 17/5009 703/2 |
| 2016/0187506 A1* | 6/2016 | Ratcliffe | G01V 1/303 702/14 |
| 2016/0238729 A1* | 8/2016 | Warner | G01V 1/282 |
| 2016/0320505 A1* | 11/2016 | D'Afonseca | G01V 1/282 |
| 2017/0031041 A1* | 2/2017 | Ratcliffe | G01V 1/282 |
| 2018/0172858 A1* | 6/2018 | Wang | G01V 1/282 |

OTHER PUBLICATIONS

Jones, Ian F., "Tutorial: Velocity estimation via ray-based tomography," First Break, vol. 28, Feb. 2010, pp. 45-52.

Wang, Chao et al., "Fast multi-parameter anisotropic full waveform inversion with irregular shot sampling," ION Geophysical Corporation, SEG Denver 2014 Annual Meeting, pp. 1147-1151.

Bai, Jianyong et al., "Simultaneous inversion of velocity and density in time-domain full waveform inversion," ION Geophysical Corporation, SEG Denver 2014 Annual Meeting, pp. 922-927.

Dingus, Carolyn, "Seismic Processing—Noise Attenuation Techniques for Relative Amplitude Processing," Petroleum Africa, Dec. 2010, pp. 47-49.

ION Geophysical Corporation, "Full Waveform Inversion," Jan. 1, 2011, from iongeo.com, 2 pages.

International Search Report and Written Opinion dated Mar. 15, 2017 in connection with International Application No. PCT/US2016/066103, 17 pages.

Youngseo et al. "An Algorithm for 3D acoustic time-Laplace-Fouerier-domain hybrid full waveform inversion." Geophysics, vol. 78, No. 4, Jul. 1, 2013, 16 pages.

Virieux, J. et al. "An overview of full-waveform invesion in exploration geophysics." Geophysics, vol. 74, No. 6, Nov. 1, 2009. 26 pages.

International Search Report and Written Opinion dated May 11, 2018 in connection with International Patent Application No. PCT/US2017/067437, 11 pages.

\* cited by examiner

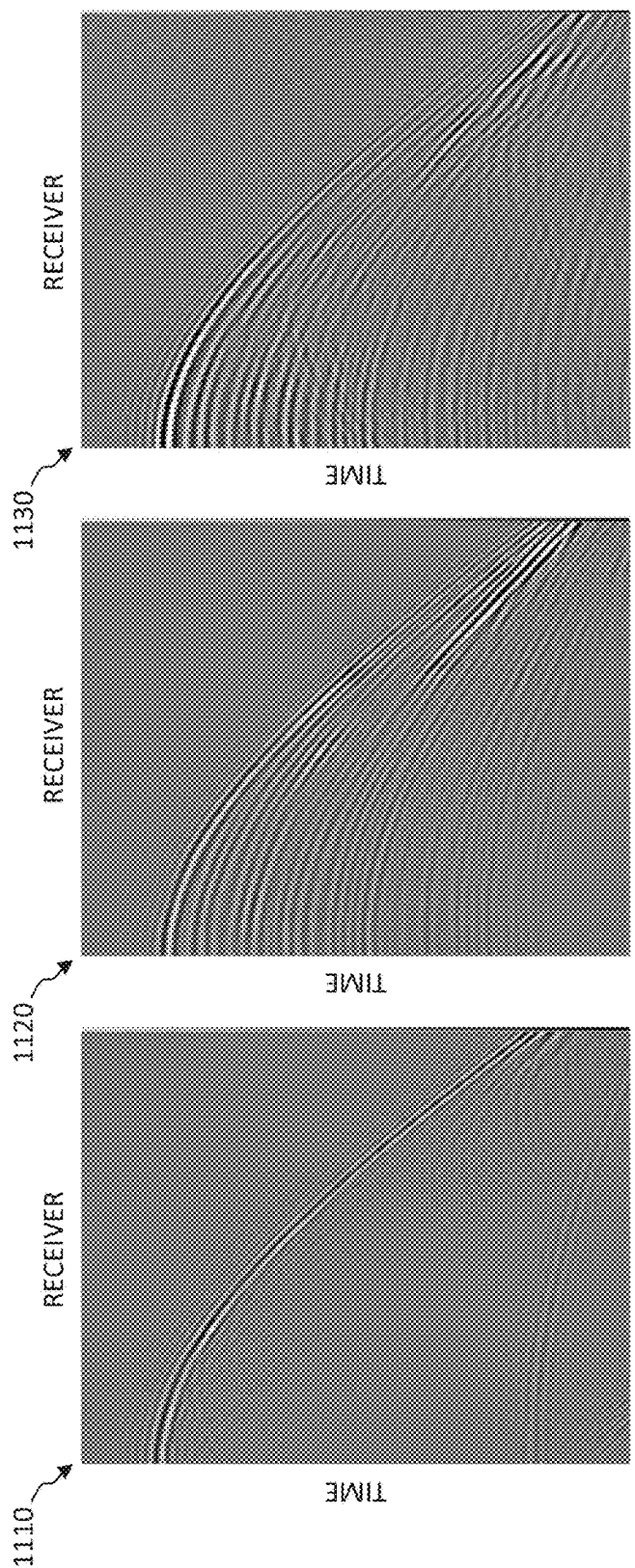

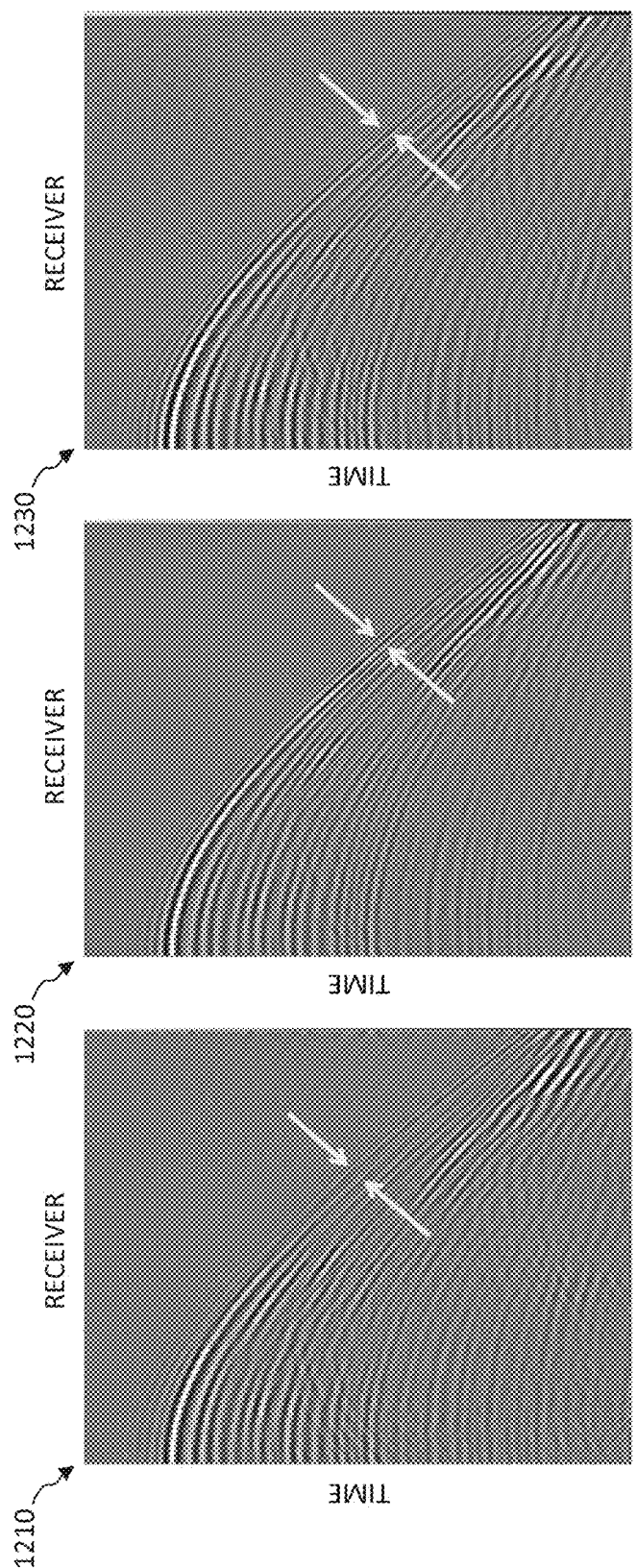

SYSTEM AND METHOD FOR RECONSTRUCTED WAVEFIELD INVERSION

CROSS-REFERENCE TO RELATED APPLICATIONS

This application claims priority to U.S. Provisional Application No. 62/266,516, filed Dec. 11, 2015, entitled SYSTEM AND METHOD FOR TIME DOMAIN RECONSTRUCTED WAVEFIELD FWI (TDRWFI), which is incorporated by reference herein, in the entirety and for all purposes.

BACKGROUND

This application relates generally to seismic data acquisition and processing, and more specifically to systems and methods for processing seismic data. In particular, the application encompasses full waveform inversion (FWI) techniques adapted to derive high-fidelity models of subsurface structures, including petrochemical reservoirs and other geophysical features.

Petrochemical products are ubiquitous in the modern economy, and can be found in everything from oil and gasoline to medical devices, children's toys, and a wide range of everyday household items. To meet the continuing demand for these products, oil and gas reserves must be accurately located and surveyed, so that these important resources can be effectively managed. As a result, there is an ongoing need for new seismic sensor systems, and for more advanced seismic exploration and imaging technologies.

Scientists and engineers typically utilize seismic wave-based exploration to locate new oil and gas reservoirs, and to survey and manage existing reserves over time. Seismic surveys are performed by deploying an array of seismic sensors or receivers over the region of interest, and monitoring the response to controlled emission of seismic energy via one or more seismic sources such as vibrators, air gun arrays, and explosive detonations. The response depends upon the seismic energy reflected from mineral reservoirs and other subsurface formations, allowing an image of the corresponding geological structures to be generated.

Conventional marine seismic surveys typically proceed by towing an array of seismic sensors or receivers behind a survey vessel, with the receivers distributed along one or more streamer cables. A set of air guns or other seismic sources is used to generate the seismic energy, which propagates down through the water column to penetrate the ocean floor (or other bottom surface). A portion of the seismic energy is reflected from subsurface structures, and returns through the water column to be detected in the streamer array. Alternatively, the seismic receivers can also be disposed along an ocean-bottom cable, or provided in the form of autonomous seismic nodes distributed on the seabed.

Geophysical data pertaining to subsurface structures is acquired by observing the reflected seismic energy with an array of seismic receiver components. Suitable seismic receivers include pressure sensors and particle motion detectors, which can either be provided individually or combined together in close proximity within a receiver module or seismic node. Suitable pressure sensors include hydrophones and hydrophone arrays adapted to record pressure measurements of the seismic wavefield propagating through the surrounding water column, or other seismic medium. Suitable particle motion sensors include accelerometers and geophones configured to provide single-axis or multi-axis (three-dimensional) velocity measurements, in order to characterize motion of the seismic medium in response to propagating seismic waves.

Seismic signals from the receiver arrays can be processed to reconstruct the seismic wavefield, and to generate images of the subsurface geology. The seismic images can also characterize subsurface composition, and geophysical structures in and around the survey area. The image quality depends on the fidelity of the wavefield reconstruction and other signal processing capabilities, creating a substantial ongoing demand for more advanced methods of inversion-based seismic imaging.

SUMMARY

In various examples and embodiments, systems and methods are encompassed for seismic wavefield data acquisition and processing, including, but not limited to, time domain reconstructed full wavefield inversion (RFWI or TDRFWI), as applied to seismic wavefield data obtained in seismic surveys. Non-transitory computer-readable data storage media embodiments are also encompassed, with program code executable by a computer processor to perform the disclosed RFWI methods.

Suitable method embodiments may comprise forward propagating a source signal based on a model of a subsurface region to generate the forward-propagated wavefield, and generating a residual based on the forward-propagated source signal in comparison to field data, where the field data are responsive to reflections of the source signal from the subsurface region. Additional method steps can include back propagating the residual to generate a reconstructed source perturbation, and adding this perturbed source wavefield to the original source to generate a reconstructed source wavefield, forward propagating the reconstructed source perturbation and adding it to the conventional forward-propagated wavefield to generate a reconstructed forward-propagated wavefield, based on the current model, where the forward and back propagating are performed in a time domain.

The model can be updated based on the forward-propagated reconstructed wavefield and the reconstructed source perturbation, and an image can be generated of the subsurface region, based on the updated model.

BRIEF DESCRIPTION OF THE DRAWINGS

FIG. 11A is a schematic illustration of representative synthetic shot gathers for the initial model of FIG. 9A, using conventional forward modeling techniques.

FIG. 11B is a schematic illustration of the synthetic shot gathers for the inverted model of FIG. 9B, using conventional forward modeling techniques.

FIG. 11C is a schematic illustration of corresponding shot gathers for field data.

FIG. 12A is a schematic illustration of synthetic shot gathers for the initial velocity model obtained using reconstructed forward modeling.

FIG. 12B is a schematic illustration of the synthetic shot gathers for an inverted velocity model, using reconstructed forward modeling.

FIG. 12C is a schematic illustration of corresponding shot gathers for field data.

DETAILED DESCRIPTION

Figure 1:
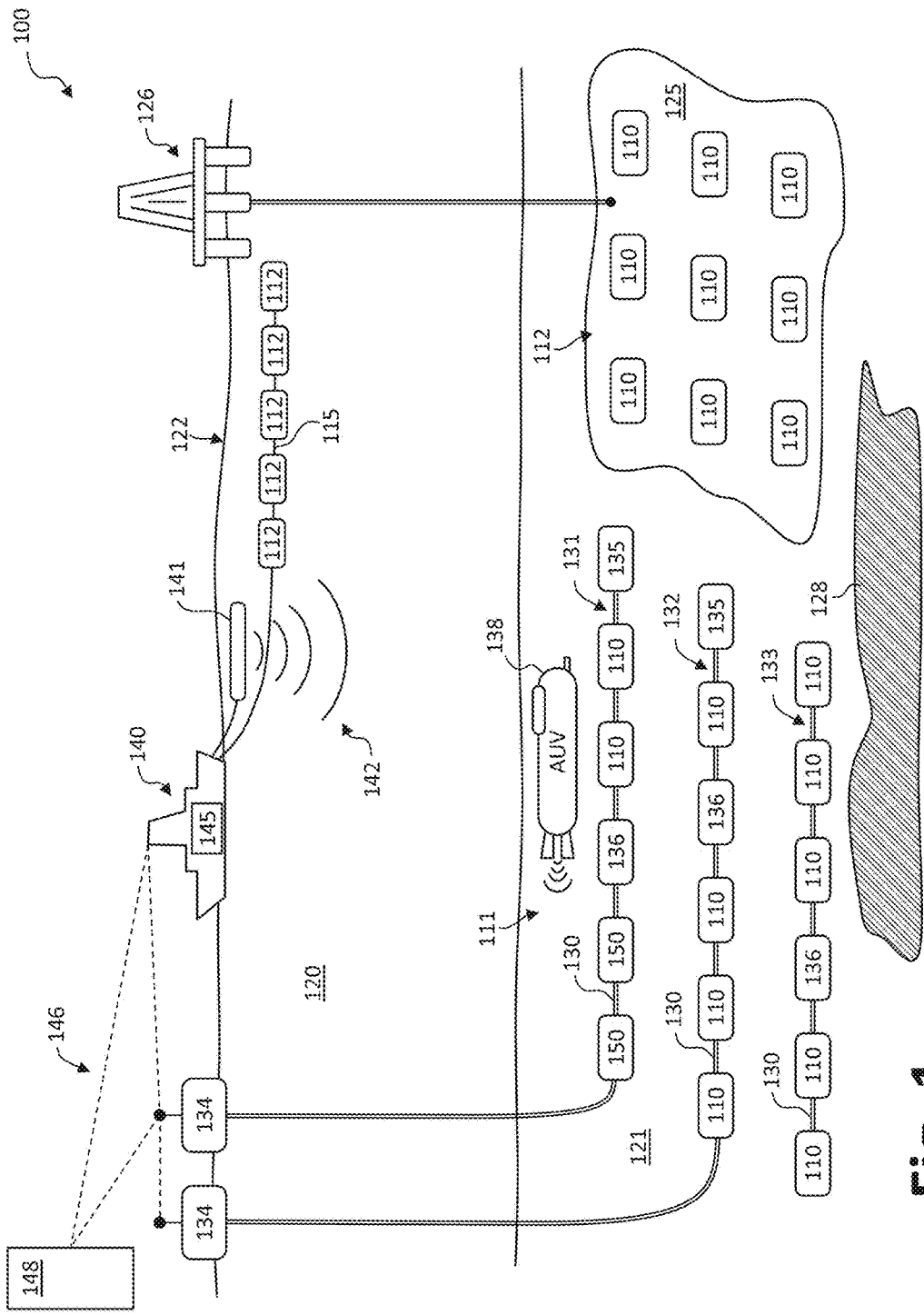
FIG. 1 is a schematic illustration of an exemplary seismic survey configured for acquiring seismic data.

In this disclosure, reference is made to examples and embodiments of the invention. However, it should be understood that the invention is not limited to these or any other specifically described embodiments. Any combination of the disclosed features and elements, whether related to different embodiments or not, is contemplated to implement and practice the invention. Furthermore, in various examples and embodiments the invention provides numerous advantages over the prior art. Although certain embodiments may achieve these and other advantages over different potential solutions, and over the prior art, whether or not a particular advantage is achieved by a given embodiment is not limiting of the invention as claimed. Thus, the following aspects, features, embodiments and advantages are merely illustrative, and should not be considered elements or limitations of the claims, except where explicitly specified in the claim language. Likewise, references to "the invention" shall not be construed as a generalization of any inventive subject matter disclosed herein, and shall not be considered to represent an element or limitation of any claim except where expressly recited therein.

Some embodiments of the invention may be implemented as a program product or executable method for use with a computerized system. Suitable programs may define functions of the various embodiments and methods described herein, and can be provided via a variety of non-transitory computer-readable media. Illustrative computer-readable media include, but are not limited to: (i) information permanently stored on non-writable storage media (e.g., read-only memory within a computer such as ROM devices or CD-ROM disks); (ii) alterable information stored on writable storage media (e.g., random access or RAM devices, flash memory and other solid-state devices, and magnetic disks or hard drives); and (iii) information conveyed to a computer by a communications medium, such as through a wireless network, including applications, program code and other information downloaded from the Internet or other network. Suitable non-transitory computer-readable media embodiments include computer-readable instructions that are executable on a computer processor to direct the various functions and method steps of the present invention, and also represent embodiments of the present invention.

Waveform Inversion

Waveform inversion techniques including full waveform inversion (FWI) can be applied to real-world (geophysical) seismic data for both resource production and research purposes. The underlying theory has been well established, and produces high-resolution subsurface models by minimizing the misfit between the seismic data and simulated seismograms obtained by solving the wave equation exactly. In practice, however, inversion is still a challenging method for updating the model parameters. A local optimization scheme can be used to solve the minimization problem, but this may not prevent convergence towards local minima because of nonlinear contributions and other potentially ill-posed or incomplete aspects of the problem. For example, FWI may converge to a local minimum because of the lack of low frequencies in the recorded data, or due to an inaccurate starting model.

A novel approach to time domain full waveform inversion is disclosed to address at least some of these concerns, using a reconstructed wavefield method (RFWI). The RFWI method can be employed to relax the constraint that the forward modeled data exactly solve the wave equation, as in conventional FWI, and instead use an L2 (or "$l_2$") approximate solution, e.g., based on a second-order Lagrange approximation or other suitable technique, taken to the desired order. RFWI techniques can also be used to estimate earth models, and to jointly reconstruct the forward wavefield by minimizing an objective function that includes penalties for both the data misfit and wave equation error. By extending the available search space, RFWI also offers potential benefits of avoiding cycle skipping and overcoming at least some of the problems associated with local minima.

This disclosure presents an implementation of such time domain RFWI techniques. The disclosure also discusses differences and similarities between conventional FWI and RFWI. Certain potential benefits of RFWI over conventional FWI are demonstrated using a 2D synthetic example, and the applicability of RFWI to field data is illustrated for both 2D streamer data sets and 3D ocean bottom seismic data sets.

In exemplary applications, these time domain reconstructed FWI techniques can be directed to seismic wavefields and other seismic survey data, in order to generate seismic images and other output for characterizing subsurface structures. These techniques may be referred to as either time domain RFWI or TDRFWI, and may be implemented in computer-based systems and methods, as disclosed herein. Non-transitory computer-readable data storage media can also be provided with program code enabling a computer-based processor system to execute the disclosed seismic data analysis techniques.

A particular approach is described which relaxes the condition that forward-modeled data solve the wave equation exactly. This can allow the forward-modeled data to begin matching field data more quickly, which may lead to faster convergence and reduced cycle skipping effects, as compared to the prior art. Suitable implementations include, but are not limited to, velocity inversion for the scalar wave equation. These systems and methods can also be applied to other models and algorithms and equation forms adapted for describing geological and geophysical processes and structures, including processes and structures related to seismic wavefields and wavefield propagation through subsurface structures.

In general, the routines executed to implement these methods and apparatus embodiments can be provided as part of an operating system, or as a specific application, component, program, module, object, or other sequence of instructions. Computer program applications typically comprise a multitude of related instructions, which can be translated by a computer processor into a machine-readable format, e.g., in the form of executable instructions. Suitable computer program embodiments also encompass additional variables, parameters and data structures, which can either reside locally with the other program data, or be found in discrete memory and storage devices. In addition, the various systems, programs and computer-executable methods described here can also be identified based upon the application for which they are implemented, according to particular embodiments of the invention. It should be appreciated that any particular nomenclature that follows is thus used merely for convenience, and the invention should not be construed as being limited to any such language, or to any specific application identified with or implied by the particular terminology that is used.

Seismic Sensor and Survey Configurations

FIG. 1 illustrates an exemplary seismic survey 100 suitable for obtaining field data processed according to various embodiments of the invention. As shown in FIG. 1, a plurality of autonomous sensor stations or nodes 110 may be deployed a body of water or water column 120, e.g., on a seabed or other bottom region 121 disposed below the surface 122 of water body 120. Alternatively or in combination, a number of similar nodes or seismic receivers 112 can be towed behind a seismic survey ship or other surface vessel 140.

As shown in FIG. 1, two or more of the nodes 110 may be deployed in an array 111 on the sea floor or bed 121 via a rope or wire 130. Similarly, a number of seismic receivers 112 can be deployed in the water column 120 along a streamer cable or streamer array 115, and towed below the surface 120 behind a seismic vessel 140.

While references may be made to a sea floor or seabed with respect to this example, practice of the invention is not limited to any particular body of water or water column. Rather, embodiments of the invention may be used in any water, marine, land-based or other environment including oceans, lakes, rivers, etc. Accordingly, the use of the term sea, seabed, sea floor, and the like should be broadly understood to encompass all bodies of water 120 and all marine or land-based surfaces 121 suitable for propagation of seismic energy.

In some embodiments, the rope 130 may be made from a synthetic material with a predefined specific density relative to the water in which it is immersed. In some embodiments, the rope 130 may be a passive rope, i.e., it may not include any electrical conductors. In alternative embodiments, the rope or cable 130 may include embedded conductors for communicating one or more of a clock signal, data signals, control signals and power among the individual seismic nodes 110. Thus, rope or cable 130 may have either a passive configuration, absent signal or power communications, or an active configuration, in which signal and/or power connections are provided.

In particular embodiments, one or more seismic nodes 110 may be deployed to the sea floor or other surface 121 via any suitable technology, e.g., via a remotely or autonomously operated underwater vehicle (ROV or AUV) 138, by dropping nodes 110 from a deployment vessel or seismic vessel 140, etc. In other embodiments, each autonomous node 110 may be equipped with a propulsion system and programmed to navigate through the water column 120 to and from predetermined locations on the sea floor 121.

As can be seen in FIG. 1, deployment of the individual seismic nodes 110 in a seismic array 111 can be thus be performed without a rope 130, and this may be advantageous in areas near obstructions, e.g., in a working area 125 of the sea floor 121 associated with an oil rig 126 or other operations, in order to avoid the rope 130 coming into contact with and potentially damaging or being damaged by obstructions and other underwater components during deployment and/or retrieval of the nodes 110.

In some embodiments, rope-deployed seismic sensor stations may be coupled to a hub or buoy 134. For example, two rope segments 131 and 132 are shown coupled to hubs 134. While the hubs 134 are shown as provided on floating buoys, this is also merely representative. In alternative embodiments, one or more of the hubs 134 may be placed on the sea floor 121. Hubs 134 may also float within the water column 120 at a predefined depth above the sea floor 121 or below the upper surface 122.

In some embodiments, the hubs 134 may include a high precision or "master" clock and communications components configured for data and/or power communications with the nodes 110. For example, a clock signal from the high precision clock may be transferred to the nodes 110 via conductors in the ropes 130, in order to facilitate clock correction or to generate a clock signal at the nodes 110.

In some embodiments, the hubs 134 may also be configured to transfer power, data, and/or control signals to the nodes 110. Accordingly, the hubs 134 may be equipped with power generation and or energy storage devices, and/or control logic for performing quality checks and implementing predefined operating protocols, and the like. In some embodiments, signals sent from the hubs may be used, for example, to recharge sensor station batteries, to perform quality and station health tests, to turn the stations on or off, etc. In some embodiments, the hub devices may be equipped with a global positioning satellite (GPS) apparatus or other positioning or navigational system, with or without a radio transmitter or receiver to facilitate determining location of the hubs 134 and communication with other the hub devices 134 and nodes 110.

In embodiments where one or more of the ropes 130 are configured to transfer power or data signals, a tail termination device 135 may be provided at an end of each rope 130.

A separate head termination device may also be provided in the hub device 134, and the sea water may be used to couple the head and tail termination devices. In some embodiments, the hub devices 134 may be omitted. For example one representative rope segment 133 is shown without an associated hub device, and without a tail termination device.

In some embodiments, a plurality of source boats or seismic vessels 140 may be simultaneously operated while acquiring seismic data with nodes 110 or receivers 112, or both. In embodiments where multiple vessels 140 are used, the source boats may be configured to operate their respective seismic sources 141 according to a simultaneous source regime. For example, the sources 141 of two or more source boats 140 may be configured to emit seismic energy substantially simultaneously, or with a predefined delay such that there is at least some overlap in the duration of emission of seismic energy from two or more sources 141. In additional embodiments, a number of nodes 110 or receivers 112 can be deployed in the water column 120 by one or more such vessels 120, and operated as a towed seismic array.

In some embodiments, a high precision clock may be included in each node 110, or in selected seismic nodes 110. In alternative embodiments, a high precision clock signal may be provided via an external master clock configured to coordinate with slave timing devices that are implemented in the seismic nodes 110. The master clock may be located on a hub device 134, or in devices 136 placed at predefined intervals along an individual rope or cable 130. In one embodiment, the devices 136 may include a high precision clock and an interface or other communications components. In alternative embodiments, the devices 136 may include other components such as power sources. In yet another embodiment, one or more such devices 136 may be configured as a "superstation" or similar seismic node, e.g., in the form of a seismic sensor device with all the components of a seismic node 110, as well as a high precision clock that can be used to provide a master clock signal to other nearby seismic nodes 110.

Data Acquisition, Communication and Analysis

Referring again to FIG. 1, one or more source boats or vessels 140 can be configured to tow seismic source(s) 141 and one or more arrays 115 of nodes or seismic receivers 112 while conducting a seismic survey. Alternatively or in combination, a number of seismic nodes 110 may be deployed in one or more arrays 111 on the ocean floor 121. In one embodiment, the seismic source(s) 141 may include one or more air guns configured to release blasts of compressed air into the water column 120, emitting acoustic energy towards the seabed 121. As shown in FIG. 1, for example, a blast of compressed air generates seismic waves 142 which travel down through the water column 120 to the seabed 121. Seismic waves 142 can also penetrate the seabed 121 to reflect from a subsurface reservoir or other structures 128.

Portions of the seismic energy reflected from subsurface structures 128 can be recorded as seismic data by the arrays 111 and/or 115 of seismic nodes 110 and seismic receivers 112, where the seismic data characterize the corresponding reflected seismic wavefield in the surrounding water column 120. The seismic data may thereafter be processed to develop an image of the subsurface layers and other structures, utilizing advanced time domain reconstructed waveform inversion and full waveform inversion techniques, as described herein. These images can be analyzed by geologists and other users employing image processing techniques, in order to identify subsurface reservoirs 128 and other structures likely to include hydrocarbons or other resources, and to locate additional geophysical features of interest.

For example, the seismic data collected by nodes 110 and receivers 112 can be communicated to a computer apparatus or similar processor system 145 on vessel 140, e.g. along streamer cable(s) 115 and/or via a wired or wireless data connection 146 to the hubs 134, which are connected to the nodes 110 via the ropes 130. Alternatively, the nodes 110 and/or receivers 112 can be recovered via the cables 115 and 130 for data retrieval on board the seismic vessel 140, or an autonomous vessel 138 or similar submersible craft can also be configured to retrieve the nodes 110 for data recovery on board vessel 140, or to recover the data from individual nodes 110 while the nodes 110 remain deployed on the ocean bed 121. Inductive and acoustic data links can also be used to transfer seismic data among any one or more of the autonomous vessel 138, nodes 110, receivers 112 and seismic vessel 140.

Typically, the seismic data are transferred from vessel 140 to a computing system 148 for inversion and image processing, for example using bulk data storage media or a wired or wireless network connection 146. Data processing and imaging system 148 may be remote, land-based, cloud-based, distributed, remotely located, or any combination thereof, for example using a cluster of computer nodes connected by a combination of local and distributed network components. Alternatively, at least a portion of the desired processing may be performed by a computer system 145 on board the seismic vessel 140. Specific preprocessing steps can also be performed by one or more of the seismic nodes 110 or receivers 112, e.g., before transfer of the data to computer system 145 on board the vessel 140 or to the remote data processing and imaging system 148.

Figure 2:
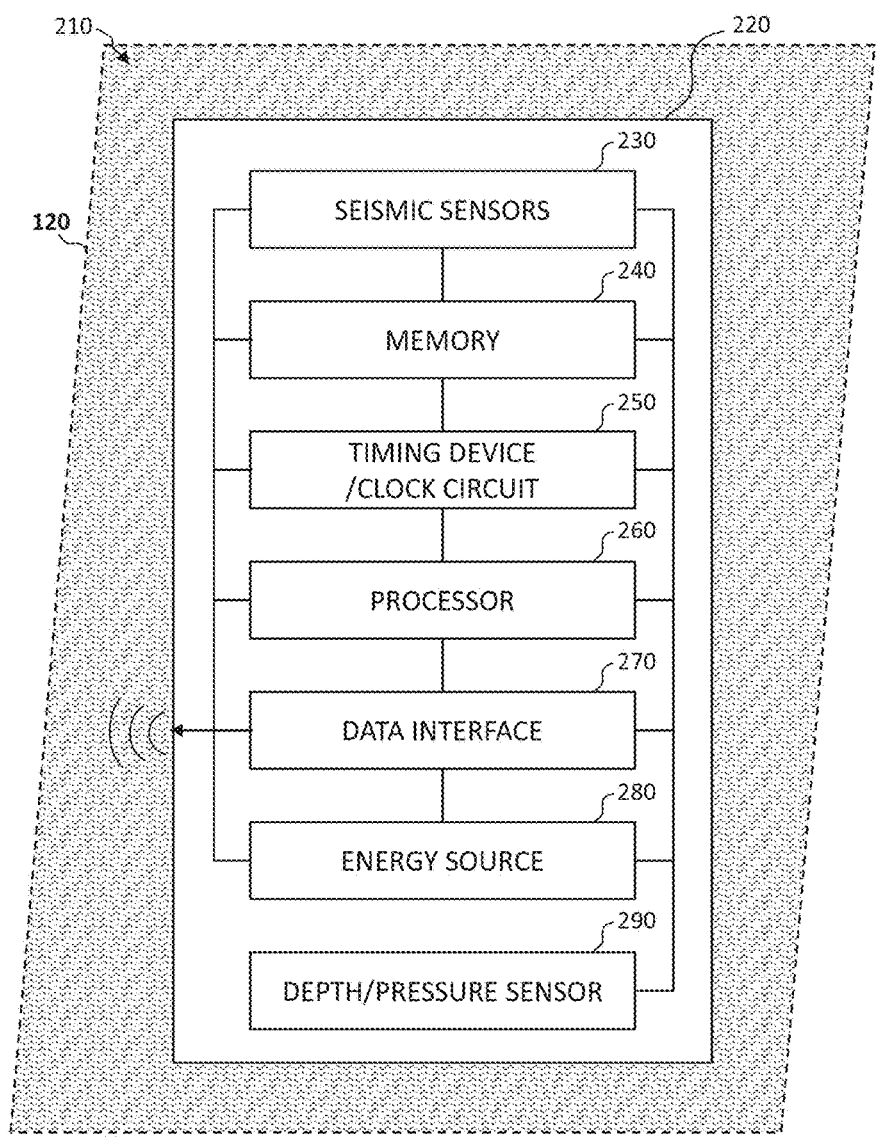
FIG. 2 is a block diagram illustrating a representative seismic sensor station or node for use in a seismic survey.

FIG. 2 is a block diagram illustrating exemplary components of a seismic sensor system or device 210, for example an ocean-bottom seismic node (OBN) 110 or seismic receiver 112 as shown in FIG. 1, or a seismic sensor station 116 or other seismic device 115. In this particular example, the seismic sensor apparatus 210 may include a housing assembly 220 disposed about internal components including one or more seismic sensors 230, a memory device 240, a timing device or clock circuit 250, one or more depth or pressure sensors 260, a processor 270, a data interface 280, and a power supply, battery or other energy source 290. Modular housing 220 can be provided in either unitary or multi-component form, depending upon the arrangement of the internal components within the one or more individual housing modules 220.

Suitable seismic sensors 230 may include any number and combination of hydrophones, geophones and accelerometer sensors, including, but not limited to, pressure sensors, single-axis accelerometers and velocity sensors, and multi-axis acceleration and velocity sensors. In some embodiments, the sensors 230 may include a combination of pressure sensors and multi-component sensors configured to measure up to three independent spatial components of motion in response to seismic waves propagating through a surrounding water column or other seismic medium 120.

Sensors 230 may be adapted to measure pressure, linear motion, rotation, or any combination thereof. Suitable seismic sensors 230 encompass both analog and digital pressure and motion sensors, including both piezoelectric sensor devices and micro-electro-mechanical system (MEMS) accelerometers.

The memory 240 is preferably a random access memory, a non-transitory storage medium, or other memory component sufficiently large to hold a desired amount of seismic data collected by the seismic sensor(s) 230 in the seismic sensor system 210. While memory 240 is shown as a single component, it should be understood that memory 240 may also comprise a plurality of discrete or integrated memory components or modules, and memory 240 may operate at multiple functional levels, including, but not limited to, high speed register and data caches functions to lower speed but typically larger memory devices such as RAM and DRAM chip components.

Depending on embodiment, the seismic sensor system 210 may include one or more of a timing device or clock circuit 250, processor 260, data interface 280 and a power supply or other energy source 290. In some embodiments, the timing device 250 may include a resonator, crystal, or oscillator configured to generate a timing signal for recording seismic data. In some embodiments, the timing device 250 may be configured to independently generate a high precision master clock signal for the seismic sensor system 210. In additional embodiments, the timing device 250 may be configured to receive an external clock signal from a master clock, and to generate a local or slave clock signal for the seismic sensor system 210, based on the external clock signal.

The processor 260 may include one or more computer processors or microprocessor components configured to convert sensor data from seismic sensors 230 into seismic data characterizing the seismic wavefield propagating through the surrounding water column or other seismic medium 120. The seismic data can be associated with a clock signal from the timing device 250, and stored in memory 240. Depending on embodiment, the processor 260 may also perform additional processing or preprocessing steps on the seismic data, for example data compression, signal identification, noise rejection, and pulse or time matching.

In some embodiments, multiple seismic sensor systems 210 can be disposed in an ocean bottom or towed seismic array. Each data interface 270 can provide a combination of hard-wired, wireless, acoustic, inductive, and other data transmission components adapted to receive operating instructions for the seismic sensor system 210, and to communicate seismic sensor data and associated timing information from memory 240 to an external seismic data processing system. In some embodiments, e.g., where higher-level distributed data processing is employed, data interfaces 270 can be configured to share seismic data among different seismic sensor systems 210, e.g., among different nodes 110 and receivers 112 disposed in one or more seismic arrays 111 or 115, as shown in FIG. 1.

Suitable energy sources 280 can be configured to provide power to one or more of the seismic sensors 230, memory 240, timing circuit 250, processor 260, data interface 270, and other components of seismic sensor system 210, such as a depth or pressure sensor 290. In some embodiments, the energy source 280 may include a battery or power supply with sufficient capacity to provide power to the components of seismic sensor system 210 for the duration of a seismic survey. In additional embodiments, power may be externally provided to the seismic sensor system 210 via a cable or inductive coupling to the energy source 290, or otherwise as described herein.

In some embodiments, the seismic sensor system 210 may include one or more depth or pressure sensors 280. The depth or pressure sensors 280 may be configured to determine a depth of the seismic sensor system 210 during deployment and retrieval in a water column 120, or other seismic medium. In one embodiment, a threshold depth may be defined for switching one or more components of the seismic sensor system 210 on or off, based on the depth signal and threshold depth.

For example, during deployment, any one or more of the sensors 230, memory 240, timing/clock circuit 250, processor 260 and data interface 270 of a seismic node or receiver 210 may not be powered by energy source 290 until a selected deployment threshold depth is reached, as measured by the depth or pressure sensors 280. Alternatively, energy source 290 may be decoupled or shut down for the seismic sensor node or receiver 210 as a whole, until the desired depth is reached. Similarly, during retrieval, when the corresponding threshold depth is reached, one or more circuits or other components 230, 240, 250, 260, 270, 280 or 290 of the seismic node or receiver 210 may be powered down. By selectively powering on or off one or more circuit elements of each seismic sensor device 210, embodiments of the invention may conserve power and extend the operating life of the seismic sensor device 210 during seismic data acquisition.

Data Acquisition and Processing

Figure 3:
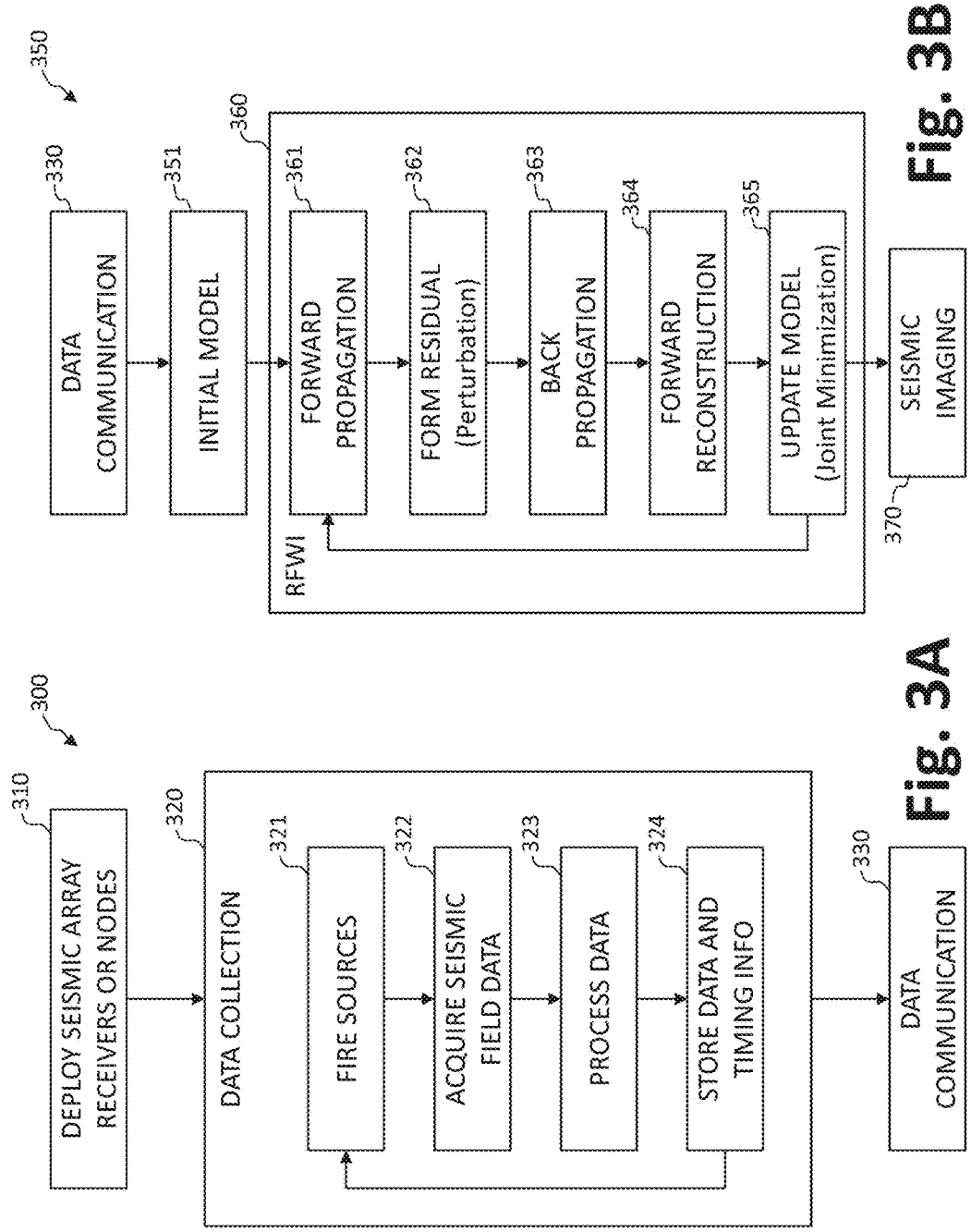
FIG. 3A is a block diagram of a method for acquiring geophysical data from a seismic survey.
FIG. 3B is a block diagram of a method for processing geophysical data acquired in a seismic survey.

FIG. 3A is a block diagram illustrating a method 300 for acquiring seismic data, including, but not limited to, data collected during operation of a seismic survey 100 and suitable for time domain reconstructed full waveform inversion, as described herein. As shown in FIG. 3A, method 300 includes one or more steps of deploying a seismic array (step 310), data collection (step 320), and data communication (step 330). These steps may be performed in any combination or order, and may include any number of additional functions, including any one or more of the additional seismic data processing steps described herein.

Deployment (step 310) comprises deploying an array of seismic sensor devices in a survey area. For example, an array 111 of seismic nodes 110 can be deployed along a number of ropes or cables 130 extending along the ocean floor 121 below a water column 120, on in an autonomous node configuration, as shown above in FIG. 1. Alternatively or in combination, an array of seismic receivers 112 can be deployed along one or more seismic streamer cables 115, and towed beneath the surface 122 of the water column 120 by a seismic vessel 140.

Data collection (320) can comprise one or more additional steps of operating one or more seismic sources (step 321), e.g., to generate a source signal that is reflected from subsurface geology in the survey area; sampling reflected seismic waves to acquire field data (step 322); performing local node and receiver-based processing or preprocessing (step 323) on the data and associated timing information; and storing the seismic data (step 324), in order to characterize the acquired wavefield. Portions of the node and receiver-based seismic data processing and preprocessing steps can take place individually or in parallel, e.g., using a number of local processors distributed throughout the seismic array.

Data communication (step 330) comprises transferring the seismic data and associated timing information to a seismic data processing cluster or similar computer apparatus, in order to perform modeling and imaging based on advanced full waveform inversion (FWI) techniques, as described herein. Alternatively or in combination, data can also be transferred among the individual seismic receivers or nodes in order to facilitate higher-level distributed data processing.

In operation, the field data are responsive to the source signature and thus to the subsurface geology, which can be imaged based on the response. More specifically, the field data are acquired (step 320) by an array of seismic sensors that are responsive to the source signature by sampling its reflection from the subsurface geology (step 322). To accomplish this, each of the seismic sensors may comprise one or more hydrophones or geophones coupled to a water column or other seismic medium through which the source signature and reflections propagate.

The seismic sensors can be deployed (step 310) in such a water column or other seismic medium as described above with respect to FIG. 1, for example as a towed streamer array or on the ocean floor proximate a hydrocarbon reservoir or other selected survey area. One or more of the sources are fired to generate the source signal (step 321), e.g., using a towed air gun apparatus. Field data are then acquired by the receivers or nodes (step 322), and are responsive to the subsurface geology based on the reflection of the source signal from the corresponding subsurface geophysical structures.

FIG. 3B is a block diagram illustrating a method 350 for processing seismic data, including, but not limited to, time domain reconstructed full waveform inversion (FWI), as described herein. As shown in FIG. 3B, method 350 operates on data communicated from a suitable seismic survey (step 330). Method 350 can also utilize an initial model (step 351) generated based on known geology, well bore data, tomography, and other information characterizing subsurface structures and other relevant characteristics of the survey region.

In representative embodiments, suitable methods 350 utilize a reconstructed full waveform inversion (RFWI) process (block 360) to perform seismic imaging (step 370). The RFWI process take place in the time domain, generating a seismic survey solution in which specialized algorithms are provided to characterize the acquired wavefield, using models that can be parameterized to include velocity, density, anisotropy, and attenuation of the subsurface geology. These techniques are applied in innovative workflows, and adapted to process selected sets of seismic data to determine the relevant physical characteristics and other properties of the subsurface structures of interest.

As shown in FIG. 3B, the RFWI process (block 360) can include one or more steps of forward source propagation (step 361), forming a residual (step 362), backward propagation or source reconstruction (step 363), forward propagation of the reconstructed source to reconstruct the wavefield (step 364), and updating the current model (step 365). These steps can be performed in any order or combination. For example, model updating (step 365) may follow both back propagation (step 363) and forward reconstruction (step 364), and an additional back propagation process (step 363) can be performed on the reconstructed source signature or reconstructed wavefield (step 364).

Method 350 can also include seismic imaging (step 370), and any number of seismic data acquisition steps used to generate field data for communication to the RFWI process (step 330), e.g., as described above with respect to FIG. 3A. The RFWI process itself (block 360) can also be iterated until the updated model approaches a selected level of fidelity, or until the reconstructed waveform conforms to the field data within a selected tolerance.

Suitable RFWI methods 350 are adapted to derive high-fidelity earth models of the subsurface structure from the acquired waveforms (or field data), and can be used to provide more accurate prospect evaluation and reservoir utilization. These RFWI techniques also improve on existing subsurface model estimates by minimizing the difference between the field data and simulated data, leveraging wave-based methodologies to generate fine-scale earth models with improved ability to resolve complex subsurface geologies.

In particular embodiments, methods 350 can include forward propagating the original source signature (step 361), e.g., based on an initial earth model (step 351) of the subsurface geology. A residual can be generated based on the forward-propagated source signature, in comparison to the field data (step 362). The field data are responsive to the source signature via reflections from the subsurface geology, as described above.

The residual can be back propagated (step 363) to generate a reconstructed source signature. The reconstructed source signature will typically differ from the original (actual) source signal, and the model can be updated (step 365) to minimize the difference (or to minimize an objective function of the difference; see below). The reconstructed source signature can also be forward propagated or forward modeled to generate a reconstructed source signature or reconstructed seismic wavefield (step 364). The reconstructed source signature can also be used to update the model by comparison to the field data (step 365), e.g., by minimizing a suitable function of the difference between the field data and the reconstructed waveform. Images of the updated model, reconstructed waveforms, and corresponding subsurface structures can then be generated (step 370), and the RFWI process can be iterated (block 360) until a desired level of fidelity is achieved.

Substantial computational savings are attained by operating in the time domain, e.g., using a simple forward propagator S and adjoint back propagator S*. This compares to known frequency-domain analysis techniques, which may require inversion of prohibitively large matrix operators, and must be performed for each frequency in the spectrum of interest. Operating in the time domain can also make the reconstructed source signature and corresponding waveforms easier to visualize, and will typically preserve timing information that can be lost in the frequency domain-based analysis.

In particular examples, a reconstructed seismic wavefield can be generated based on the forward-propagated version of the reconstructed wavefield (step 364), and compared to the field data by projection onto a plurality of corresponding receiver locations. This provides for correction of the reconstructed wavefield, so that the projection converges toward the field data obtained at the corresponding receivers. Thus, the reconstructed seismic wavefield can be corrected based on the forward-propagated source signature, which is projected onto the receiver locations to synthesize and match the corresponding field data.

In some embodiments, the reconstructed source signature can be back propagated (step 363) and used to further update the model (step 365). This analysis can also be performed in the time domain, e.g., by back propagating the source signature to the original source firing time.

The earth model used in the propagation steps typically includes one or more seismic parameters that characterize the subsurface geology. An objective function can be generated based on the seismic parameters and the reconstructed source signature, based on a comparison to the field data. In this approach, updating the model (step 365) can be performed by generating a gradient of the objective function with respect to the reconstructed source signature, and minimizing the objective function based on the gradient so that the reconstructed waveform converges to the field data observed at the receiver locations. Updating the model (step 365) can also include generating a second gradient of the objective function with respect to one or more of the seismic parameters, and minimizing the objective function based on the second gradient. In this approach, updating the model can be performed by joint minimization of the objective function, either sequentially or in parallel, based on both the first and second gradients.

In addition to the seismic field data, well log data and other geological information can also be used for the initial earth model (step 351), and to act as constraints on inversion, propagation, reconstruction, and updating the model to reflect the subsurface structures of interest (steps 361-365). Well constraints can also be used to stabilize the results of the iterative RFWI procedure (block 360), and to help accelerate the algorithm toward a viable solution for seismic imaging (step 370). Beyond improved algorithm fidelity, these new combinations of workflows can also help ensure data integrity and computational efficiency throughout the iterative RFWI process. Source wavelet quality control also helps validate the synthetic models, so the field data can be matched to high precision. An irregular shot sampling capability can also deliver substantial savings in compute cycles, while maintaining high-quality image delivery.

Time Domain Reconstructed Full Waveform Inversion (TDRFWI)

Time-domain based inversion techniques can be applied to field data gathered by a seismic data acquisition system, as described above, in order to obtain high-quality seismic images and other information about the subsurface structures and physical properties of interest. These techniques can also be adapted for either land-based or marine seismic surveys, or both, as known in the art.

One goal of full waveform inversion (FWI) is to estimate earth properties from the seismic data and other information acquired on the surface. Suitable FWI techniques provide methods to build high-fidelity earth models for seismic imaging, which can minimize the misfit or difference between the acquired field data and modeled (synthetic) data, and which can be implemented not only in the frequency domain but also in the time domain, as described herein. This approach can also present highly nonlinear, potentially ill-posed or incomplete analysis problems, and mitigating the effects of convergence to local minima remains an important challenge. Cycle skipping problems may also result, if there is a lack of low frequency data, and convergences to local minima may be more likely without a good starting model.

For time domain-based FWI, synthetic data can be extracted from a wavefield generated by solving the wave equation, e.g., with an exact numerical solver using a finite difference scheme. In this disclosure, a novel approach to time domain FWI is employed, referred to as full waveform inversion with a reconstructed wavefield (RFWI), where the exact solution of the wave equation can be replaced with an $l_2$ approximation, or other suitable approximation. While conventional FWI searches for an earth model such that the simulated wavefield solves the wave equation exactly, therefore, and where the simulated data have the best match to the field data, RFWI operates over different earth models and the wavefield jointly in order to minimize the data misfit, subject to the wavefield being consistent with the wave equation in an $l_2$ sense.

Unlike the misfit function of conventional FWI, the RFWI approach also encompasses adding the wave equation error as a penalty term to the original data misfit. Instead of solving for one unknown, e.g., an earth model, two unknowns can be considered, including both the model and a forward propagated wavefield or reconstructed source term. The wavefield can be reconstructed and the model parameters can be estimated according to different applications of the technique, e.g., in an alternating fashion. The wavefield can also be reconstructed by minimizing the wave equation error, and the data misfit. A least squares solution can computed by solving the normal or standard equation, and the reconstructed wavefield can be used for updating the model parameter(s), e.g., using a gradient-based optimization method. Such wavefield reconstruction and inversion techniques can also be introduced in the frequency domain, or encompass suitable implementations of time domain RFWI based on a finite difference scheme applied to 3D large-scale data sets.

By expanding the search space, RFWI can force the forward modeled data to better fit the field data, and avoid cycle skips. Model parameters can then be updated by enforcing the wave equation in an $l_2$ sense (or similar approximate sense), as described herein. RFWI techniques may also mitigate some of the problems with local minima that occur in conventional FWI, e.g., when there is a lack of suitable low frequency data, or when the initial model is inadequate. The RFWI approach can also take advantage of the reflected seismic waves, in order to reconstruct deeper portions of the model than is accomplished in conventional FWI, which usually relies on diving waves. More generally, RFWI also demonstrates advantages for reconstructing waveforms and generating seismic images in areas with strong velocity contrasts, and other variable geophysical structures.

In particular examples and embodiments of the full-waveform inversion (FWI) techniques described herein, high-fidelity velocity models can be obtained for seismic imaging by minimizing a cost function (or "objective function") based on the difference between the experimental wavefield data acquired in a seismic survey ("field data"), and the corresponding synthetic or modeled wavefield data. In one such example, a suitable cost function C(v) can be defined for a velocity model as follows:

$$C(v) = \sum_s \sum_r \sum_t (u_0(t, x_r, x_s) - u(t, x_r, x_s; v))^2 \qquad [1]$$

In this expression, $u_0(t,x_r,x_s)$ represents the observed seismic data set for the source and receiver positions ($x_r$ and $x_s$, respectively), at a particular time (t). More specifically, $u_0$ may define the field data response at the receiver position $x_r$ to an impulse w(t) at a given source position $x_s$. Conversely, $u(t,x_r,x_s;v)$ can represent the corresponding simulated or modeled (synthetic) data, for a given velocity model. While velocity modeling is described as a representative example, the model can also be parameterized to include velocity, density, anisotropy, attenuation of the subsurface geology, and other suitable physical parameters, and any combination thereof.

The acquired waveform (field data response) u typically depends upon the velocity via a wave equation. In one approach, the Laplace (del squared or $\Delta$) and d'Alembert ($\Box$) operator notation can be used, with the source term $f(t,x,x_s)$ defined by the impulse w(t) at a particular source location ($x_s$), using the Dirac delta $\delta(x-x_s)$. For example, $$\Box u(t,x,x_s;v) = f \qquad [2A]$$

and $$f(t,x,x_s) = w(t)\delta(x-x_s). \qquad [2B]$$

The d'Alembert operator is:

$$\Box = \Box(v) = \frac{1}{v^2}\partial_t^2 - \Delta, \quad [3A]$$

where $$\Delta = \nabla \cdot \nabla. \quad [3A]$$

A forward modeling operator (F) can be used to generate a solution to the wave equation, e.g., by applying the forward modeling operator (F) to the source term (f):

$$u = Ff \leftrightarrow u = \Box f, \quad [4A]$$

where $$u(t,x) \equiv 0; t \ll 0. \quad [4B]$$

In these expressions, the solution u(t,x) is defined to be zero for time t<<0; that is, before the source or impulse is generated. A restriction or projection operator (R) can be applied to restrict the observed data (u) as follows, e.g., projecting the wavefield from all of space to the known receiver locations (for an obvious source):

$$C(v) = \|Ru - u_0\|^2 = \|RF(v)f - u_0\|^2 \quad [5]$$

To determine a suitable cost function for seismic data analysis based on time domain reconstructed full-waveform inversion (TDRFWI), it may not necessarily be required that the synthesized or modeled data (u) solve the wave equation exactly (that is, $\Box u \neq f$). For example, a modified TDRFWI cost function can be obtained that depends both upon the modeled velocity parameter v and the observed data $u_0$; e.g., where the difference in the wavefield solution is scaled by some value of a scaling parameter or other scalar term λ:

$$\tilde{C}(v,u) = \|Ru - u_0\|^2 + \lambda^2\|\Box u - f\|^2 \quad [6]$$

For a forward propagating wavefield (u) this implies a form u=Fg, where the forward modeling operator (F) operates on a distributed or reconstructed source function (g). The cost function can be recast in these terms as follows:

$$\tilde{C}(v,g) = \|RF(v)g - u_0\|^2 + \lambda^2\|g - f\|^2 \quad [7]$$

where $$u = F(v)g, \quad [8A]$$

and $$\Box u = g. \quad [8B]$$

Joint minimization can be performed over the velocity model (v, or other model parameter m) and the reconstructed source function (g). In a representative two-step process, minimization may be performed with respect to the reconstructed source function (g), for any fixed velocity (v), and the gradient can be computed with respect to the velocity (v). Gradient search methodologies can also be utilized, for example one or more of a non-linear conjugate gradient (NLCG) method, or using a Broyden-Fletcher-Goldfarb-Shanno (BFGS) algorithm, or a limited memory BFGS (L-BFGS) methodology.

A least squares approach can be suitably defined for minimization of the function (g). In some embodiments, the solution can be rewritten or represented as follows:

$$\min_g \left\| \begin{pmatrix} RF \\ \lambda I \end{pmatrix} g - \begin{pmatrix} u_0 \\ \lambda f \end{pmatrix} \right\|. \quad [9]$$

Other suitable minimization techniques can also be used, either alternatively or in combination. Thus, the function g(v) can be computed or determined according the modeled velocity, and written in terms of the forward modeling (F) and restriction operators (R) and their conjugate transposes or adjoints (F*, R*), with the source term (f) scaled by the parameter $\lambda^2$. For example:

$$g = g(v) = (F^*R^*RF + \lambda^2 I)^{-1}(F^*R^*u_0 + \lambda^2 f), \quad [10]$$

and $$(F^*RF + \lambda^2)g = (F^*u_0 + \lambda^2 f). \quad [11]$$

The source signature (f) can also be applied to characterize the function (g) as a sum of two terms, one for the unmodified source term (f) and another contribution ("g-tilde") scaled by the parameter $\lambda^2$. In some such examples, the result can be represented as follows:

$$g = f + \tilde{g}/\lambda^2 \quad [12]$$

Depending on application, it may be seen that the second (tilde) term can be determined based on the forward modeling (F) and restriction operators (R), and the conjugate transpose of the forward modeling operation (F*), as applied to the acquired data ($u_0$) and the source term (f). In some embodiments, a suitable form may be provided as follows:

$$\tilde{g} = F^*u_0 - F^*RFf + F^*RF\tilde{g}/\lambda^2 \quad [13]$$

In some applications the second term may be relatively small, as compared to the other contributions, or more difficult to include (or both). Depending on embodiment, this term may be sufficiently small to be substantially ignored, or otherwise minimized, in order to provide an approximate or estimated source term $g_2(v)$:

$$g_2 = F^*(v)u_0 - F^*(v)RF(v)f \quad [14a]$$

The estimated term $g_2(v)$ can be scaled by the factor $\lambda^2$ and combined with the source signature (f), in order to represent the source function g(v) as follows:

$$g(v) = f + g_2(v)/\lambda^2 \quad [14b]$$

Determination of the modeled velocity parameter (v) may proceed accordingly, given the v-dependent minimum for the function (g). For example, the nominal cost function C(v) may be considered in terms of a TDRFWI cost function of both the velocity (v) and the function g(v):

$$C(v) = \tilde{C}(v, g(v)). \quad [15]$$

In a case where the function (g) is sufficiently close to a minimum, the gradient of the cost function with respect to g may be close to zero, or substantially zero. That is:

$$\nabla_g \tilde{C}(v, g(v)) \approx 0. \quad [16]$$

So, the gradient of the cost function with respect to v may be given approximately by:

$$\nabla_v C = \nabla_v \tilde{C} + \frac{\partial v}{\partial g}\nabla_g \tilde{C} \approx \nabla_v \tilde{C}. \quad [17]$$

In some embodiments, the velocity parameter (v) and the function (g) may be substantially decoupled. Referring to the above definitions and forms, this can yield an expression for the velocity-dependent gradient of the cost function based on the restriction operator (R), the forward-modelling operator (F), and the partial velocity derivative ($\partial_v$), as applied to the function (g) and the observed wavefield ($u_0$). For example:

$$\nabla_v \tilde{C} = 2 \langle R \partial_v F g, R F g - u_0 \rangle. \quad [18]$$

In some applications, a representative or "standard" theme may be applied to quantify the result, e.g., using an identity relation to express the effect of the partial velocity derivative ($\partial_v$) on the forward modeling operator (F). In some embodiments, suitable forms may be described as follows:

$$\Box(v) F(v) = I \rightarrow \Box(\partial_v F) + (\partial_v \Box) F = 0, \quad [19a]$$

and $$\Box(\partial_v F) = \left(\frac{2}{v^3} \partial_t^2\right) F \rightarrow (\partial_v F) = F\left(\frac{2}{v^3} \partial_t^2\right) F. \quad [19b]$$

These forms can be combined with the above expression for the velocity gradient of the cost function, in order to quantify a suitable result. For example, $$\nabla_v C = \left\langle \frac{2}{v^3} \partial_t^2 F g, F^* R F g - F^* u_0 \right\rangle = -\left\langle \frac{2}{v^3} \partial_t^2 F g, g_2 \right\rangle. \quad [20]$$

Reconstructed Full Waveform Inversion (Rfwi)

As opposed to conventional FWI, moreover, where substantially exact solutions are sought for the waveform, in reconstructed FWI (RFWI), approximate solutions may be obtained as described above. In particular embodiments, for example, an "$l_2$" approximation or similar suitable approximation technique may be used. Similarly, where conventional FWI optimizes over earth model parameters to minimize the data misfit, RFWI minimizes over both the model parameters and the reconstructed wavefields to jointly minimize the data misfit and wave equation error. Conventional FWI thus requires a combination of good starting models and low frequency data, and typically relies on more refractions. The RFWI approach addresses some these limitations, e.g., as related to cycle skipping, and introduces improved treatment of reflections to better define the corresponding subsurface structures.

The RFWI techniques described here also differ from the prior art by operation in the time domain, rather than in the frequency domain. This approach is based on a finite difference scheme, and can be applied to large-scale 3D data sets because the computational costs are substantially less that in more traditional approaches.

Consider the following general form for a wave equation:

$$\Box[m] u = f \quad [21a]$$

Here m represents the subsurface model parameters, $\Box[m]$ is the wave operator (or d'Alembert operator), which depends upon the modeling parameters m, u is the wavefield, and f is the source term (or source function). Letting S[m] denote a solution operator of the forward propagated wave equation, the forward-propagated (simulated or synthetic) wavefield can be represented as follows:

$$u = S[m] f. \quad [21b]$$

To generate a velocity model an acoustic wave equation may be used, with a corresponding velocity-based operator S[v]. Note that this particular nomenclature is merely representative, however, and many other suitable seismic parameters and operator forms may also be employed, without loss of generality.

The inversion process can be formulated as a constrained minimization problem; e.g., in a form such as:

$$\min_{u, v} \frac{1}{2} \|Pu - d_0\|_2^2, \quad [22a]$$

where the minimization process can be performed such that:

$$\Box[v] u = f. \quad [22b]$$

In these expressions P is a restriction operator (e.g., a projection operator that generates the projected wavefield Pu as modeled at various discrete receiver locations), and $d_0$ is the actual recorded field data. This nomenclature is also merely representative, and can be generalized as known in the art. For example, suitable restriction operators P may also be represented as R and suitable field data $d_0$ may be represented by $u_0$, as described above, or using other suitable mathematical forms. Similarly, the normalization operator or bracket terms ("$\| \|$") also take a variety of forms, both with and without explicit subscript and/or superscript notation. Leading factors of two (and other normalization or scale factors) can also be considered arbitrary, particularly if the scaled function is to be minimized anyway.

The traditional approach of prior art FWI techniques was to solve the wave equation substantially exactly for a given source f. By replacing the forward propagated wavefield u with the solution S[m] f, however, an objective function can be obtained that uses the norm of the difference between the acquired field data and computer simulated forward modeled data. Depending on embodiment, the function may depend on particular selected model parameters (m), for example as follows:

$$J[m] = \frac{1}{2} \|PS[m] f - d_0\|_2^2. \quad [23]$$

Alternatively, the objective function (J) may be referred to as a cost function (C), and a specific velocity model v can be used in place of the generic parameter model m. While the expressions here may thus be defined in terms of a specific objective or cost function for a particular wave equation and corresponding model parameters, therefore, other conventions and nomenclatures are also known, and additional models such as velocity, density, anisotropy, and attenuation are also encompassed.

In some embodiments, the RFWI approach can thus be implemented to relax the constraint that u be an exact solution of the wave equation to produce an $l_2$ approximation (or other suitable approximation). For example, a "penalty term" may be added to the wave equation error utilizing a scaling parameter or scalar ($\lambda$). Thus, a modified or "penalized" objective function can be introduced, which depends on both the wavefield (u) and the model parameters (m), as well as the scaling parameter:

$$\tilde{J}_\lambda[u, m] = \frac{1}{2} \|Pu - d_0\|_2^2 + \frac{\lambda^2}{2} \|\Box[m] u - f\|_2^2. \quad [24]$$

In this expression, the first ("data misfit") term is based on the difference between the actual field data ($d_0$) and the simulated or synthetic data (Pu), obtained by restricting the simulated wavefield (u) to the physical receiver locations via the projection operator (P). The second ("wave equation error") term depends on the difference between the source function (f) and the d'Alembert (wavefield) operator ($\Box$), as applied to the simulated wavefield (u).

The simulated wavefield (u) can be defined as forward-going to fall within the range of the forward-propagation operator S; that is, u=S[m] g, for some function g. The function g can be referred to as the reconstructed source, or alternatively as the extended source. Note that the extended source (g) relates to the simulated wavefield via $\Box[m]u=g$, so the second term of the objective function can be cast in terms of the reconstructed source and generalized model parameters (m), e.g., as follows:

$$J_\lambda[g,m] = \frac{1}{2}\|PS[m]g - d_0\|_2^2 + \frac{\lambda^2}{2}\|g - f\|_2^2. \quad [25]$$

This presents a joint minimization problem with respect to both the extended or reconstructed source term g, and the model parameter(s) m. In operation, the objective function can be minimized with respect to the extended source term (g) for a fixed set of model parameters m, which characterizes the relevant seismic characteristics of the current model. The objective function can then be minimized with respect to the model parameters (m), for a given reconstructed source term (g).

The minimization process can be iterated until the desired level of fidelity is achieved. Since a mismatch or residual is built into the reconstructed source term (g), the reconstructed wavefield (u) may converge to a value closer to the true wavefield data ($d_0$), for both reflections and refractions. Depending on embodiment, the procedure may be considered equivalent to solving a least squares problem, e.g., in a form such as:

$$\min_g \left\| \begin{pmatrix} PS[m] \\ \lambda I \end{pmatrix} g - \begin{pmatrix} d_0 \\ \lambda f \end{pmatrix} \right\|_2^2. \quad [26]$$

In some of these embodiments, the problem can be reduced to solving a normal equation, e.g., such as:

$$S^*P^*PSg + \lambda^2 g = S^*P^*d_0 + \lambda^2 f. \quad [27]$$

Generally, the reconstructed source (g) can thus be considered in terms of a solution of the corresponding normal equation. For example, writing the reconstructed source term (g) as a perturbation of the original (unperturbed) source term f:

$$g = f + \delta f, \quad [28]$$

The perturbation of the source ($\delta f$) can in turn be expressed according to an asymptotic expansion, e.g., as follows:

$$\delta f = S^*P^*d_0/\lambda^2 - S^*P^*PSf/\lambda^2 + 0(1/\lambda^4). \quad [29]$$

To provide additional computational feasibility (and reduce processing costs), terms of order ($1/\lambda^4$) may be substantially ignored on the right-hand side of the equation. Using a tilde symbol ("~") for wavefield terms that have been approximately reconstructed, the corresponding source term ("g-tilde") can be approximately determined from an expression such as:

$$\tilde{g} = f + \tilde{\delta f}, \quad [30]$$

in which:

$$\tilde{\delta f} = S^*P^*(d_0 - PSf)/\lambda^2 \quad [31]$$

Depending on embodiment, this may be sufficiently close to a minimum so that the gradient with respect to the reconstructed source term is approximately zero. That is:

$$\nabla_g J_\lambda[g(m),m] \approx 0. \quad [32]$$

In some embodiments, a new or alternative objective function can also be defined, e.g., as follows:

$$\tilde{J}[m] = J_\lambda[g(m),m], \quad [33]$$

from this expression, it can follow that:

$$\nabla_m \tilde{J}_\lambda = \frac{\partial g}{\partial m} \nabla_g J_\lambda + \nabla_m J_\lambda \approx \nabla_m J_\lambda. \quad [33]$$

Depending on embodiment, an additional step also can be performed to minimize the objective function with respect to selected model parameter(s) m. Having reconstructed the reconstructed source term, for example, the forward wavefield can be reconstructed as:

$$\tilde{u} = S\tilde{g}. \quad [34]$$

The reconstructed source term (g-tilde) can in turn be expressed in the same form as above:

$$\tilde{g} = f + \tilde{\delta f}. \quad [35]$$

To obtain an express or explicit form of the d'Alembert operator ($\Box$) in terms of the velocity (v) or other model parameters (m), the form of the wave equation is considered. In some embodiments, for example, an isotropic acoustic wave equation can be used, e.g., where the d'Alembert operator has a form such as:

$$\Box[v] \triangleq f\left(\frac{1}{v^2}\partial t^2 - \Delta\right). \quad [36]$$

In this expression, the model parameter(s) m for which the inversion is to be performed are represented by a particular velocity model parameter v, but that is merely exemplary. In additional embodiments, any one or more of the velocity, density, anisotropy, attenuation and other suitable physical parameters can be used to represent the underground geology and other relevant characteristics of the seismic medium, through which the observed seismic wavefields propagate.

In some embodiments, the fixed forward wavefield ("u-tilde") can be reconstructed in a form such as:

$$\tilde{u} = S\tilde{g}, \quad [37]$$

as described above; e.g., with:

$$\tilde{g} = \Box \tilde{u}. \quad [38]$$

Depending on embodiment, the velocity model v (or other model parameters m) can be updated using a conjugate gradient method, or other suitable technique. In one particular example, the gradient for the objective function can be determined with respect to the velocity v or other model parameter(s) m using one or more expressions such as:

$$\nabla_v \tilde{J}_\lambda \approx \nabla_v J_\lambda [g, v]; \quad [39a]$$

$$= -\left\langle \frac{2}{v^3} \partial_t^2 Sg, S^*P^*d_0 - S^*P^*PSg \right\rangle; \quad [39b]$$

$$\approx -\left\langle \frac{2}{v^3} \partial_t^2 S\tilde{g}, S^*P^*d_0 - S^*P^*PS\tilde{g} \right\rangle; \quad [39c]$$

$$= -\left\langle \frac{2}{v^3} \partial_t^2 S(f + \delta f), S^*P^*d_0 - S^*P^*PSf - S^*P^*PS\delta f \right\rangle; \quad [39d]$$

and $$\approx -\left\langle \frac{2}{v^3} \partial_t^2 \tilde{u}, S^*P^*(d_0 - PSf) \right\rangle + \left\langle \frac{2}{v^3} \partial_t^2 Sf, S^*P^*PS\delta f \right\rangle. \quad [39e]$$

In some applications (e.g., in order to reduce computational complexity for either synthetic data or real examples, or both), the second term can be substantially ignored or considered substantially close to zero, in order to estimate the gradient with respect to the velocity v (or other model parameters m). In some of these embodiments, for example, a suitable form for the gradient can be represented by:

$$\nabla_v \tilde{J}_\lambda \approx -\left\langle \frac{2}{v^3} \partial_t^2 \tilde{u}, S^*P^*(d_0 - PSf) \right\rangle. \quad [40]$$

A nonlinear conjugate gradient method can be used for descent direction, with a line search or similar process for the step length. The velocity model can then be updated accordingly, based on the results.

This methodology is not limited to the isotropic acoustic wave equation, and can be extended to more general waveforms. The RFWI approach can also be used to perform multi-parameter inversions for velocity and other subsurface models, such as anisotropy parameters, an attenuation quality factor, density, and combinations thereof, either simultaneously or sequentially.

When the penalty scalar λ is sufficiently large, RFWI and conventional FWI techniques may converge to similar results. In order to produce more favorable RFWI model updates, the scalar (or scaling factor) λ should thus be chosen carefully, according to the particular wave equation and model parameters that are used, and based on the underlying geophysics of the subsurface structures that are being modeled.

This approach can be summarized in a number of representative method steps, e.g., as shown in FIG. 3A and FIG. 3B, which may be performed in any order or combination, and iterated in order to converge upon a suitable solution. In the particular area of seismic inversions for geophysical applications (e.g., oil and gas exploration and related resource development), these techniques can be applied to seismic waveforms or reflection data obtained during seismic surveys, in order to obtain a subsurface mapping or other information about the geology of an underground reservoir. More particularly, these inversion techniques can be applied to transform seismic wavefield data in the time domain, as well as in the frequency domain, in order to generate improved quantitative descriptions of reservoirs and other subsurface structures, with reduced computational costs.

Figure 4:
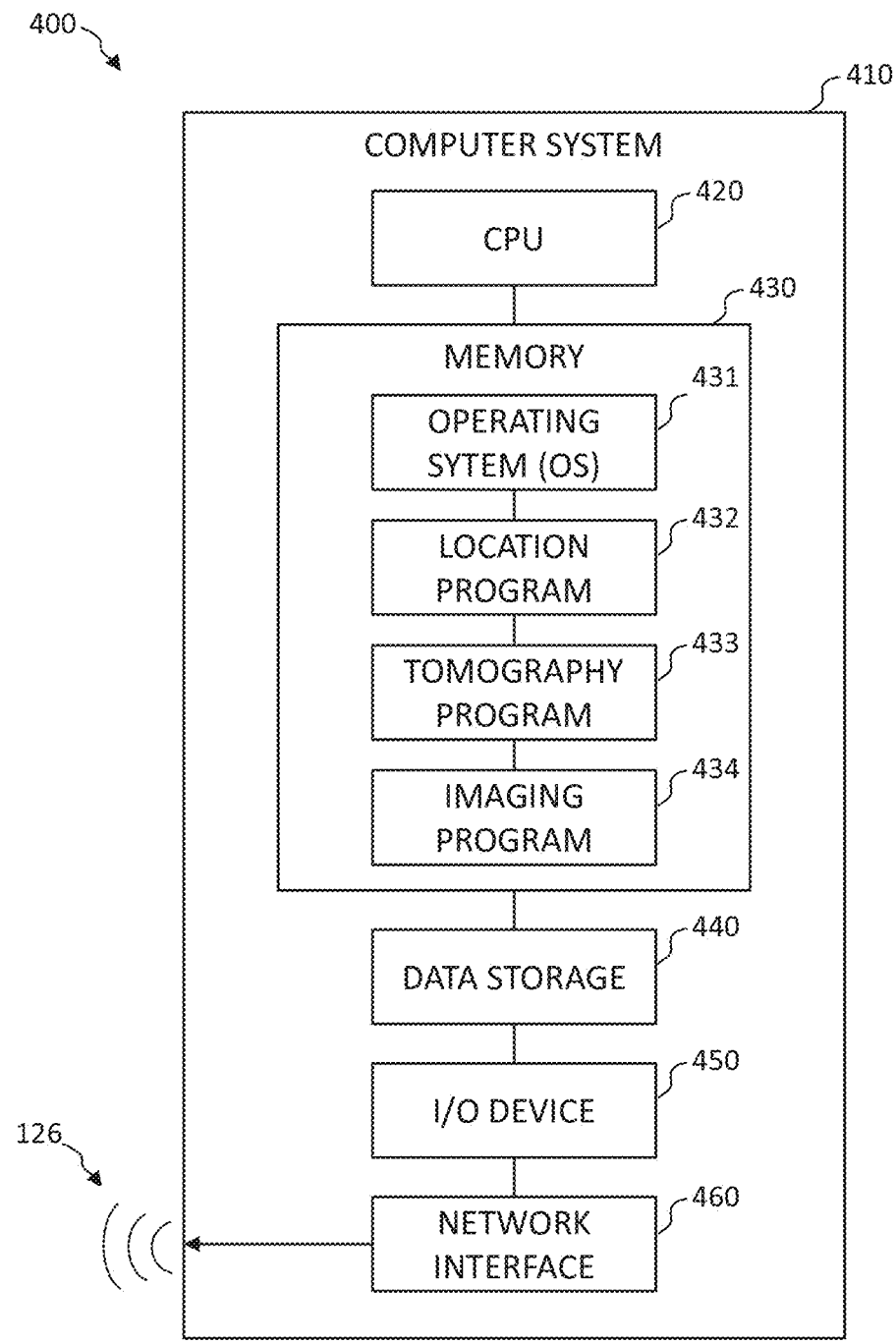
FIG. 4 is a block diagram of a computer processing apparatus configured to process data from a seismic survey.

FIG. 4 illustrates an exemplary computer system 400 that can be configured to practice such a method 350 as shown in FIG. 3B, and which can be adapted to the other systems, methods and non-transitory computer readable media implementations disclosed herein. As shown in FIG. 4, the computer system 400 may include one or more individual data processing systems 410, each having at least one central processing unit (CPU) 420, one or more memory components 430, a data storage system 440, an input/output device or user interface 450, and network interface device 460.

While a single CPU 420 is shown in FIG. 4, in alternative embodiments, a plurality of CPUs 420 may be implemented within each data processing system 410. Alternatively or in combination, a number of data processing systems 410 can be combined into a processing cluster 400, e.g., using local or wide-area wired or wireless network connections to the individual network interfaces 460.

The memory 430 can incorporate random access memory components with sufficient storage capacity to hold programming and data structures adapted to practice the advanced seismic data analysis techniques described herein. While the memory 430 is shown as a single component, it should be understood that the memory 430 may incorporate a plurality of memory elements operating at different functional levels, e.g., high speed registers, caches, and RAM or DRAM chips, as described above.

In the particular example of FIG. 4, the memory 430 includes an operating system or OS module 413, but any suitable operating system supporting the functions disclosed herein may be used. The memory 430 may also include one or more of a location program module 432, a tomography program module 433, and an imaging program module 433. Each of these program components may be executed by a CPU 430 in order to execute the seismic data processing techniques disclosed herein.

The data storage system 440 typically encompasses one or more direct access storage device (DASD) elements. Although shown as a single component, the data storage system 440 can also be implemented as a combination of fixed and/or removable storage devices, e.g., one or more disc drives, tape drives, portable memory cards, flash memory devices, and other electronic, magnetic, and optical storage media. One or both of the memory system 430 and the data storage system 440 can also be implemented as part of a virtual address space, spanning multiple primary and secondary storage devices.

The input/output (I/O) device 450 may include user interface devices such as a mouse, keyboard, trackball, stylus pen, touchscreen, display (e.g., computer monitor), and the like. Suitable input/output devices 450 can thus be adapted to receive operating instructions and other user input for selective processing of acquired waveforms and other field data obtained in one or more seismic surveys, and to provide output in the form of image data that can be displayed to characterize the corresponding subsurface structures.

The network interface device 460 can incorporate any number of suitable transmission or data entry/exit devices such as network adapters and network interfaces, which are configured to provide local and remote network communications between and among individual data processing systems 410 within a particular computer system 400. The network interface devices 460 can also be adapted to provide communications between individual computer systems 400, including clustered and distributed seismic data processing and imaging systems, as described herein, as well as additional network connections to remote and local servers, internet systems, cloud-based computing and storage components, and the like.

The computer system 400 may be centralized, distributed, or remotely located, and can incorporate any combination of ship-board, remote, and node or receiver-based processing components, as described herein. In centralized configurations, one or more individual data processing systems 410 can be connected via a local network to create a ship-based seismic data processing system or cluster 145, or a remote data processing system 148 communicating over a remote network 146, as shown in FIG. 1.

Figure 5A:
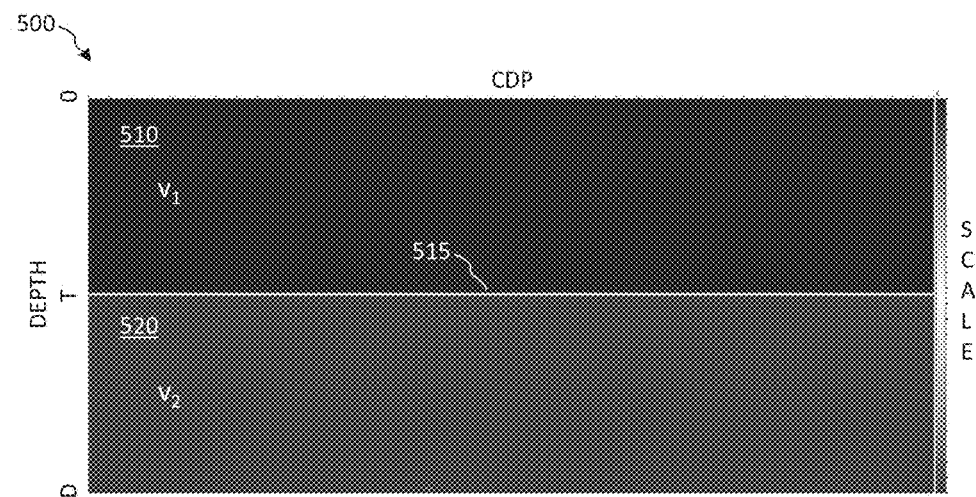
FIG. 5A is a schematic illustration of a true velocity model of a representative subsurface geology.

FIG. 5A is a schematic illustration of a true velocity model 500 for a representative subsurface geology. Depth is represented on the vertical axis and common depth point (CDP) is represented on the horizontal axis, both in arbitrary units.

As shown in FIG. 5A, the true velocity model 500 is represented by a first region 510 having a first characteristic velocity ($v_1$) extending from the surface at depth 0 to a transition or interface 515 at depth T. A second region 520 extends below first depth region 510 and the interface 515, with a second characteristic velocity ($v_2$).

The velocity is scaled on the right-hand side of the true velocity model 500, also in arbitrary units. As shown in the true velocity model 500, the first and second characteristic velocities ($v_1$ and $v_2$) are different but each is substantially uniform across the CDP axis. The interface 515 represents a quasi-discontinuous or other relatively sharp change from the first velocity ($v_1$) to the second velocity ($v_2$), indicating a corresponding change in the geophysical medium.

Figure 5B:
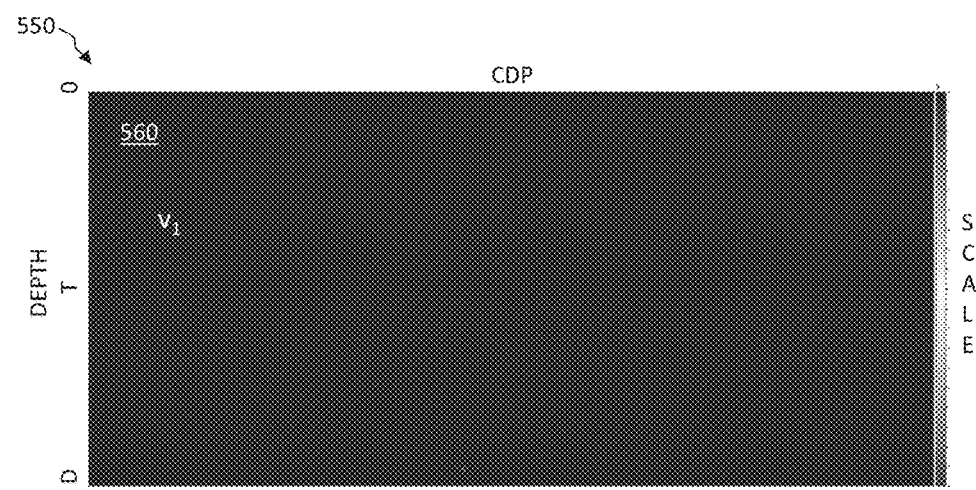
FIG. 5B is a schematic illustration of an initial velocity model for the subsurface geology.

FIG. 5B is a schematic illustration of an initial velocity model 550 for the representative subsurface geology. As shown in FIG. 5B, the initial model 500 has a single region 560 in which the first characteristic velocity ($v_1$) extends substantially uniformly from the surface at depth 0 to depth D, and substantially uniformly across the CDP axis. In this initial model 550, there is no known geological transition at the depth T, and no corresponding modeled change in the characteristic velocity.

Figure 6A:
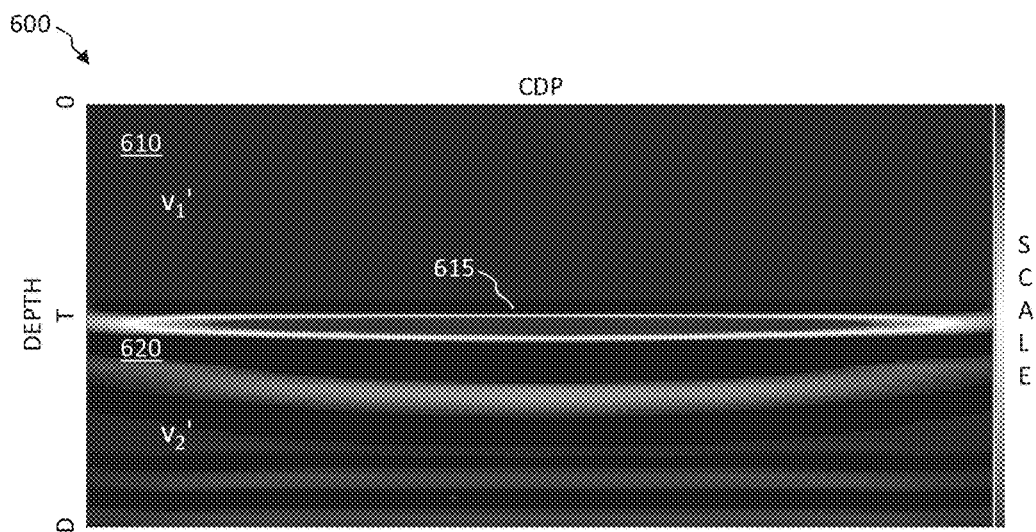
FIG. 6A is a schematic illustration of an inverted model generated using conventional techniques to image the subsurface geology.

FIG. 6A is a schematic representation of an inverted model 600 using conventional FWI techniques to image the subsurface geology. As shown in FIG. 6A, the inverted model 600 distinguishes first and second modeled velocity regions 610 and 620, separated by an interface 615 modeled at approximately the transition depth T. The first modeled velocity ($v_1'$) is substantially uniform across the CDP axis in region 610, at least outside a certain distance of the transition 615. The second modeled velocity ($v_2'$), however, is substantially nonuniform across second region 620.

More generally, the conventional FWI-based inverted model 600 illustrates the effect a local minimum, while missing low frequency data represented by the substantially uniform second velocity ($v_2$) in the true velocity model 500 of FIG. 5A. While the first modeled velocity ($v_1'$) may only be substantially nonuniform approaching the interface 615, at the transition depth T, the second modeled velocity ($v_2'$) demonstrates substantial nonuniformity across the second region 620, from the interface 615 down to depth D. Thus, the relatively high-frequency feature represented by the sharply-modeled transition 615 is imaged, but the relatively lower-frequency, substantially uniform velocity characteristics of the lower depth region may be missed, as illustrated in the second modeled region 620.

Figure 6B:
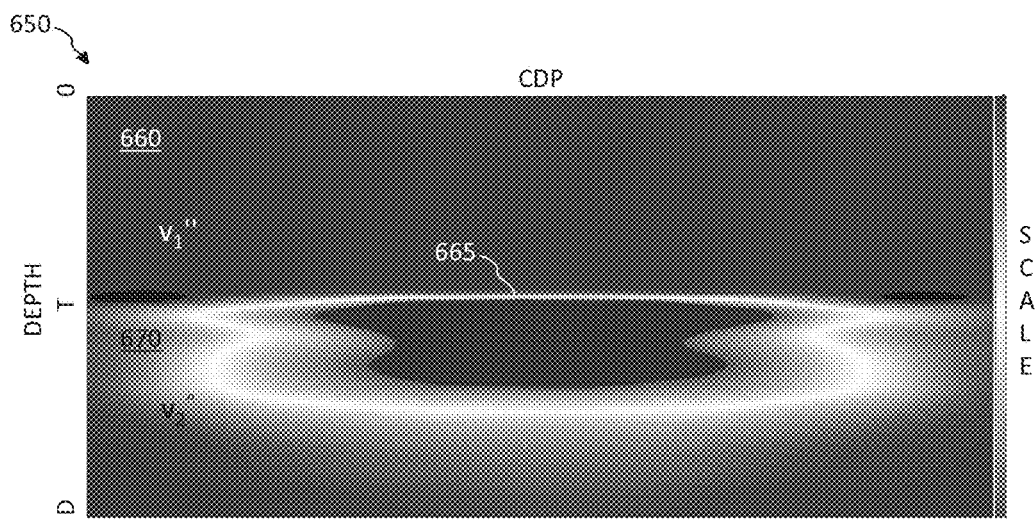
FIG. 6B is a schematic illustration of an inverted model generated using time domain reconstructed FWI techniques to image the subsurface geology.

FIG. 6B is a schematic illustration of an inverted model 650 generated with time domain reconstructed FWI techniques to image the subsurface geology. As shown in FIG. 6B, the modeled velocity ($v_1''$) is substantially uniform across the upper modeled region 660, extending substantially from the surface at depth zero down to the modeled interface 665 at transition depth T, particularly in the middle CDP region toward the center of the model.

The time-domain reconstructed FWI-based model 650 also converges without losing low frequency data in the lower modeled region 670, where the modeled velocity ($v_2''$) extends more uniformly below the transition depth in the middle CDP region, as compared to the conventional FWI-based model 600 of FIG. 6A. The time-domain reconstructed FWI-based model 650 also has greater fidelity in this region, as can be shown by comparison to the true velocity model 500 in FIG. 5A.

Representative benefits of the time-domain reconstructed FWI techniques described herein can include faster convergence, for example with fewer forward adjustment and/or forward modeling steps. These techniques can also avoid cycle skipping, and mitigate some of the problems associated with local minima, as well as providing improved salt model updates. This approach can also produce better full-wave inversion and imaging results for reflected data, where the reconstructed wavefield has (or includes) more reflection information, which in turn can be utilized to produce more detailed geophysical models.

Figure 7A:
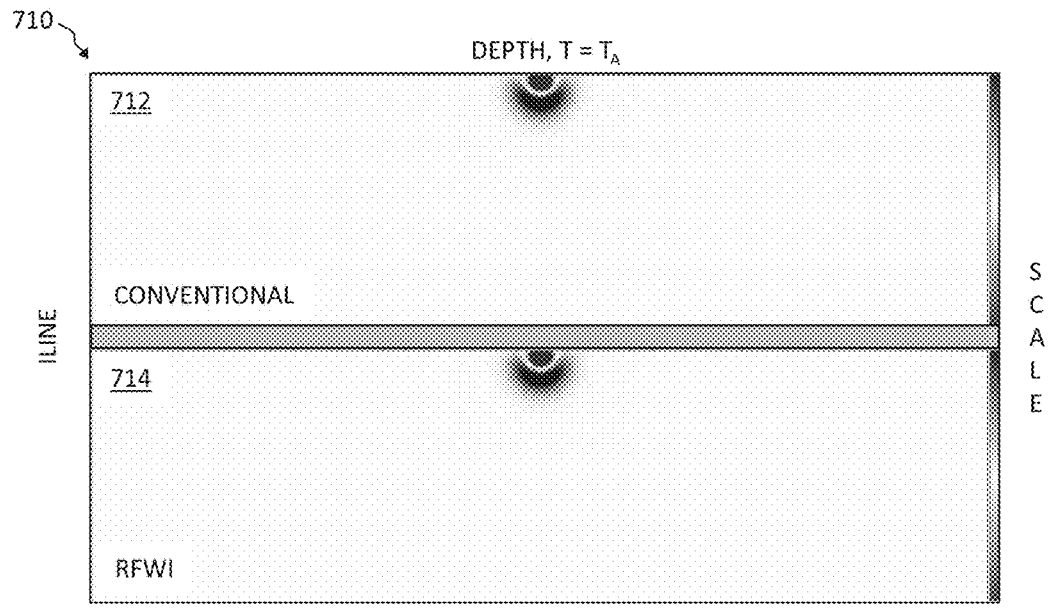
FIG. 7A is a schematic illustration of 2D synthetic seismic data using conventional and reconstructed wavefield representations.

FIG. 7A is a schematic illustration (710) of 2D synthetic seismic data using conventional (top, 712) and reconstructed wavefield (RFWI) representations (bottom, 714), in the time domain. The depth, inline and velocity scales are arbitrary. For times $T_A \approx 0$ as shown in FIG. 7A (that is, near the source firing time), the wavefields have not yet propagated to the velocity transition, and the conventional waveforms (712) may be similar to the RFWI waveforms (714).

Figure 7B:
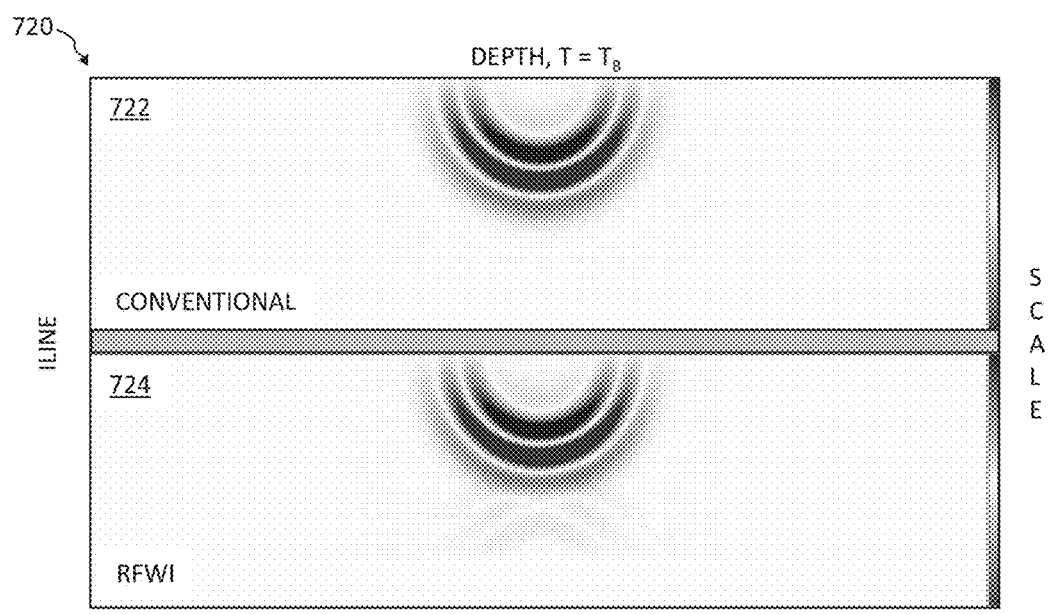
FIG. 7B is a schematic illustration of the 2D synthetic seismic data, forward propagated in the time domain.

FIG. 7B is a schematic illustration (720) of the 2D synthetic seismic data of FIG. 7A, at time $T_B > T_A$. As shown in FIG. 7B, the traditional reconstruction (722) does not appear to be sensitive to the velocity transition, while the lower portion of the RFWI representation (724) indicates that the transition may have been reached. Because the forward modeling is performed in the time domain, the images can be simply illustrated at a particular time $T_B$ as shown, rather than considering the data in the frequency domain, in which timing information may be lost.

Figure 7C:
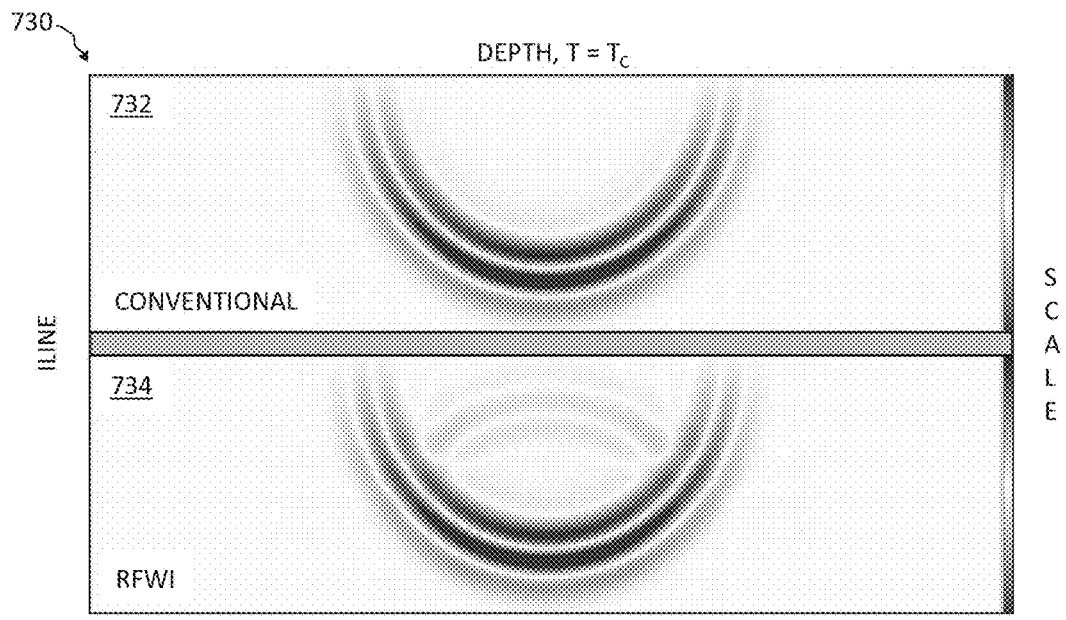
FIG. 7C is a schematic illustration of the 2D synthetic seismic data at a later time.

FIG. 7C is a schematic illustration (730) of the 2D synthetic seismic data of FIG. 7A, at time $T_C > T_B$. As shown in FIG. 7C, substantial reflections appear in the RFWI representation of the synthetic seismic data (734) due to the velocity transition, while the traditional technique (732) remains insensitive to the boundary. The reflections also appear naturally at time $T_C$ in the time-domain based approach, where time $T_C$ is defined after the time $T_B$ at which the velocity transition is reached.

Figure 7D:
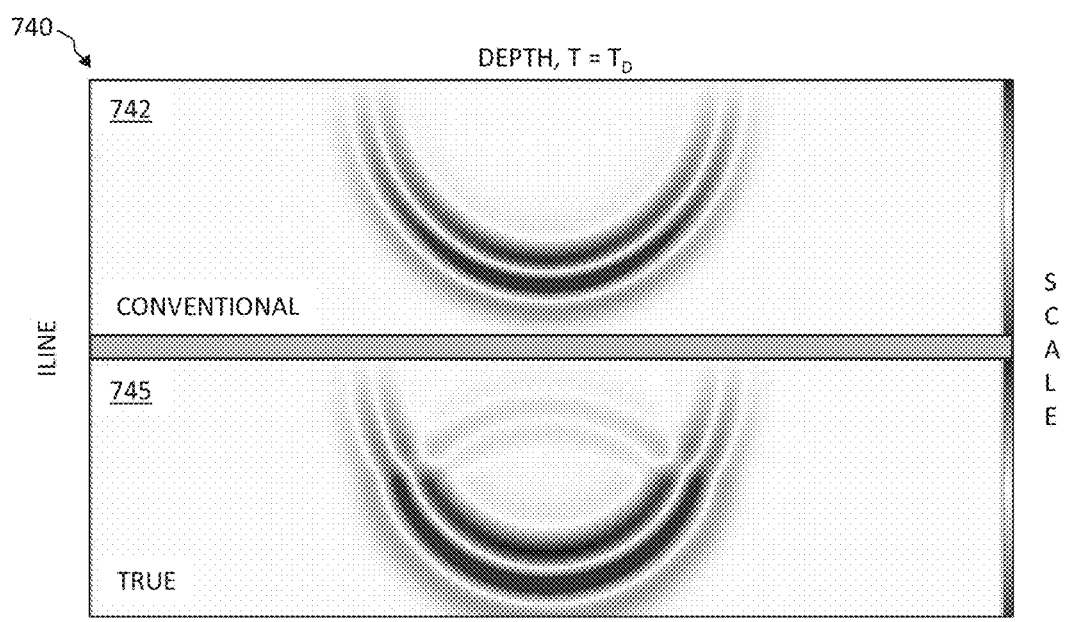
FIG. 7D is a schematic illustration of the conventional 2D synthetic seismic data as compared to the true wavefield.

FIG. 7D is a schematic illustration (740) of the conventional 2D synthetic seismic data (top, 742), as compared to the "true" waveform data (745) based on complete knowledge of the velocity model (including the geophysical boundary represented by the velocity transition). As shown in FIG. 7D, the conventional synthetic data do not exhibit the reflections that are present in the true waveform data. Comparing to the RFWI data of FIG. 7C, on the other hand, the more advance time domain-based approach provides a more accurate representation of the true wavefield, including both the downgoing component and the upgoing reflections.

Figure 8A:
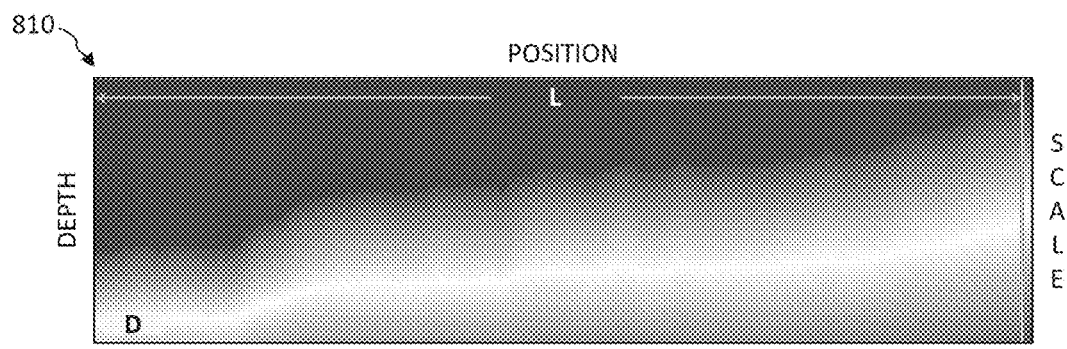
FIG. 8A is a schematic illustration of an initial velocity model for a selected seismic survey location.
Figure 8B:
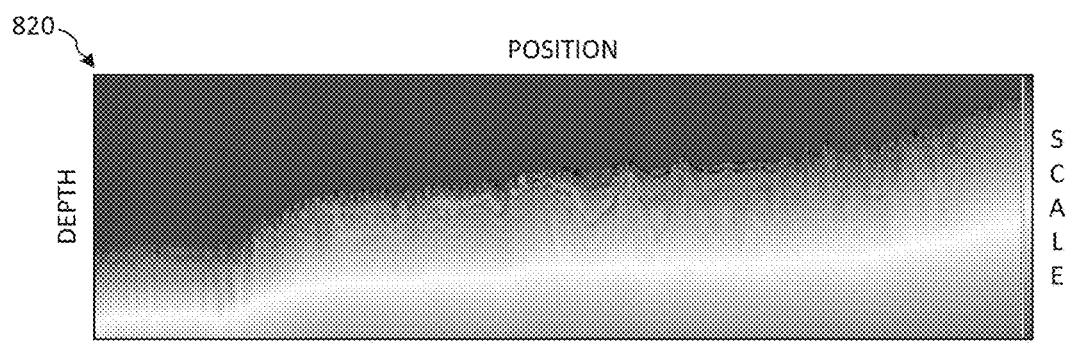
FIG. 8B is a schematic illustration of a conventional inverted velocity model corresponding to the initial model.
Figure 8C:
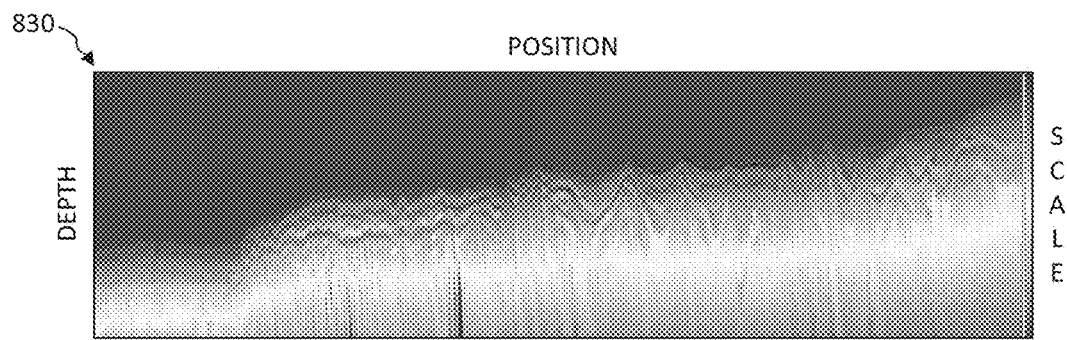
FIG. 8C is a schematic illustration of an inverted velocity model using reconstructed waveform inversion.

FIG. 8A is a schematic illustration of an initial velocity model 810 characterizing geophysical structures in a selected real-world seismic survey location. FIGS. 8B and 8C are the corresponding inverted velocity models, using conventional inversion (FIG. 8B) and reconstructed waveform techniques (FIG. 8C), respectively. The scales for depth (D) and lateral position (L) are arbitrary.

As shown in FIGS. 8A-8C, reconstructed full-waveform inversion (RFWI) techniques can provide substantially more detailed modeling updates, as compared to a conventional inversion. Thus, RFWI techniques can help mitigate issues related to cycle skipping and local minima effects, providing improved seismic modeling and imaging. The RFWI approach also introduces reflections earlier in the inversion process, as described above, and may perform substantially better than traditional inversion techniques in areas with strong velocity contrasts and other substantially discontinuous geophysical structures of interest. More generally, RFWI techniques can also produce substantially improved and more meaningful deep model updates, as compared to other, more traditional approaches.

Figure 9A:
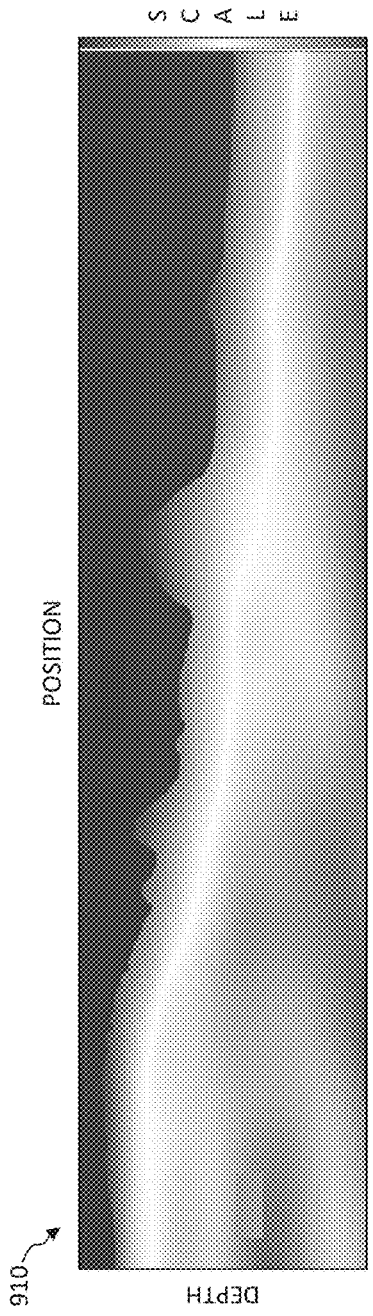
FIG. 9A is a schematic illustration of an initial velocity model for an alternate seismic survey location.
Figure 9B:
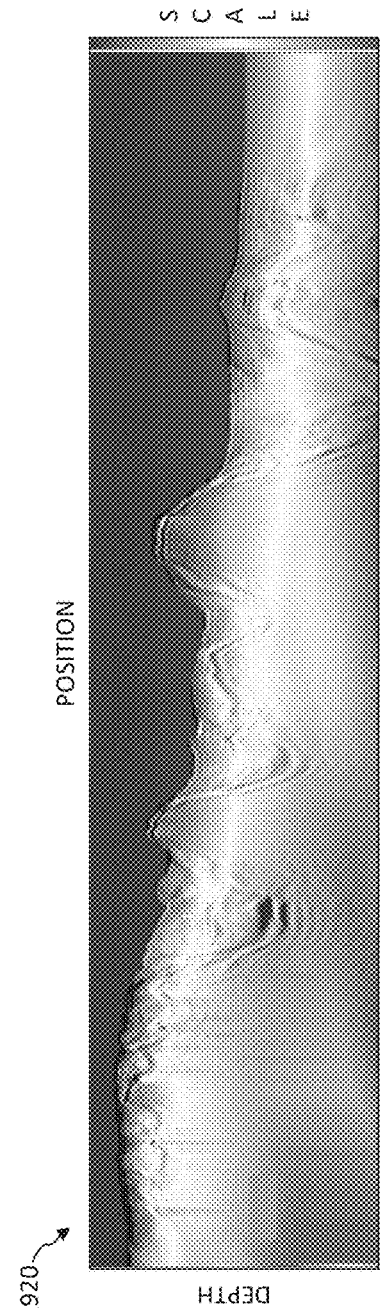
FIG. 9B is a schematic illustration of an inverted velocity model obtained using reconstructed waveform inversion.

FIG. 9A is a schematic illustration of an initial velocity model 910 characterizing geophysical structures in an alternate real-world seismic survey location. FIG. 9B is a schematic illustration of the corresponding inverted velocity model 920, using reconstructed full waveform inversion as described herein. As shown in FIG. 9B, RFWI can provide improved modeling and seismic imaging results for a range of different real-world subsurface geologies.

Figure 10A:
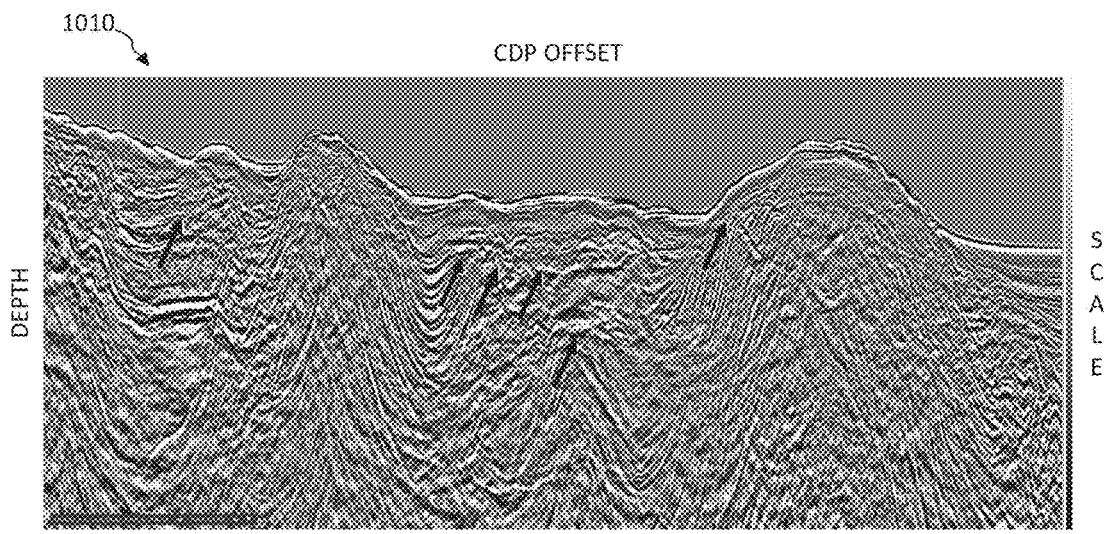
FIG. 10A is a stack image corresponding to the initial velocity model of FIG. 9A.
Figure 10B:
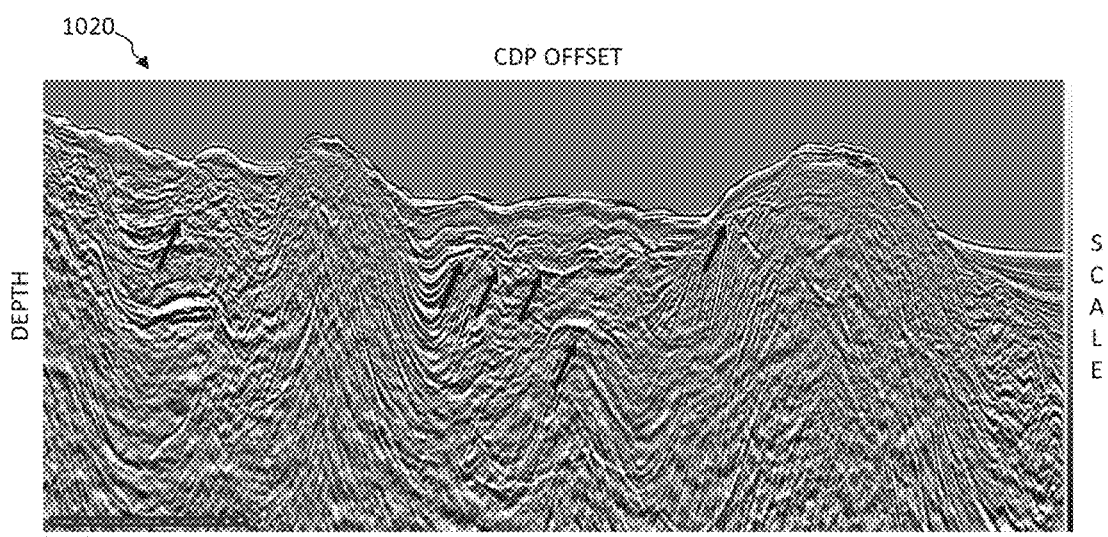
FIG. 10B is a stack image for the updated velocity model of FIG. 9B, using reconstructed waveform inversion.

FIG. 10A is a stack image 1010 corresponding to the initial velocity model of FIG. 9A. FIG. 10B is an updated stack image 1020 for the updated velocity model of FIG. 9B, obtained via reconstructed waveform inversion (RFWI) techniques. As shown by the arrows in FIGS. 10A and 10B, the updated RFWI model provides substantially improved detail in a number of different regions of interest.

FIG. 11A is a schematic illustration of representative synthetic shot gathers 1110 for a seismic survey, using the initial model of FIG. 9A and conventional forward modeling techniques. FIG. 11B is a schematic illustration of the synthetic shot gathers 1120 obtained using the inverted model of FIG. 9B and conventional forward modeling techniques, and FIG. 11C is a schematic illustration of the corresponding shot gathers 1130 for the actual field data.

FIG. 12A is a schematic illustration of the synthetic shot gathers 1210 for the initial model of FIG. 9A, using reconstructed forward modeling. FIG. 12B is a schematic illustration of the synthetic shot gathers 1220 obtained for the inverted model of FIG. 9B using reconstructed forward modeling, and FIG. 12C is a schematic illustration of the corresponding shot gathers 1230 for the actual field data.

As shown by comparing the initial model-based gather plots of FIGS. 11A and 12A, the RFWI approach provides substantially more detail in the shot gather plots 1210 of FIG. 12A, as compared to the conventionally obtained plots 1110 of FIG. 11A. This additional level of detail carries over into the RFWI model plots 1220 of FIG. 12B, which provide a more accurate representation of the actual field data in FIG. 12C, as compared to the conventionally obtained data of FIG. 11B, contrasted with the (same) field data in FIG. 11C. The arrows in the RFWI FIGS. 12A-120 indicate a selected area of interest in the seismic survey data, where the conventional data in FIGS. 11A and 11B may also be less accurate, particularly at the initial model stage (FIG. 11A). More generally, the RFWI data in FIG. 12B can also converge more quickly and accurately to the field data, improving fidelity of the reconstructed model.

Figure 13A:
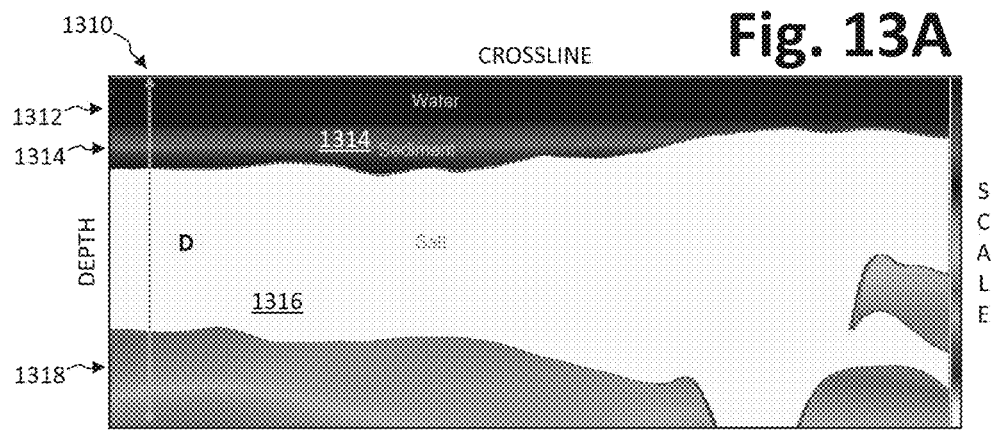
FIG. 13A is an initial velocity model for the subsurface geology below a water column, including sediment and a salt formation.

FIG. 13A is an initial velocity model 1310 for a subsurface geology observed below a water column 1312, including sediment 1314 and a salt formation 1316 disposed above an underlying bedrock or other subsurface structure 1318. The crossline and depth scales are arbitrary.

Figure 13B:
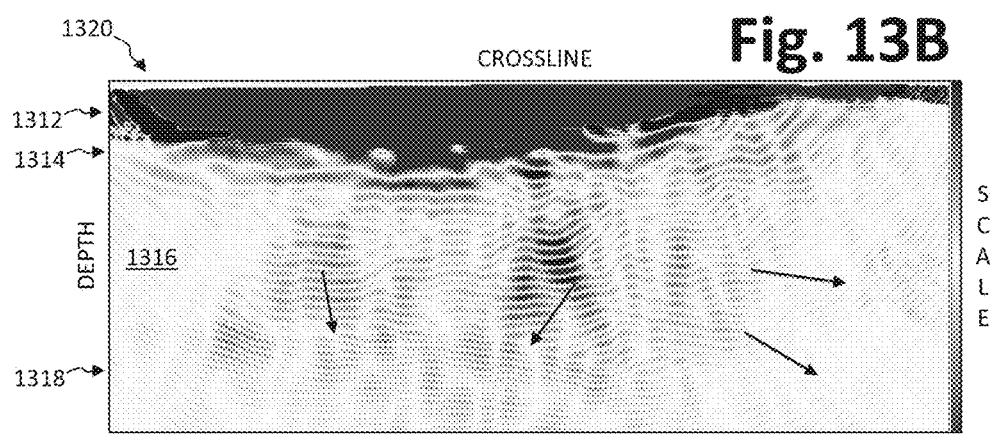
FIG. 13B is a first velocity gradient for the subsurface geology, obtained using conventional inversion techniques.

FIG. 13B is a first velocity gradient plot 1320 for the subsurface geology of FIG. 13A, obtained using conventional inversion techniques. As shown in FIG. 13B, the conventional velocity gradient 1320 does not substantially distinguish between the water column 1312 and the bottom sediment 1314, at least along a substantial portion of the crossline direction. The upper transition to the salt formation 1316 is somewhat resolved, but there is little indication of other important features including the transition to the substructure 1318 (see arrows).

Figure 13C:
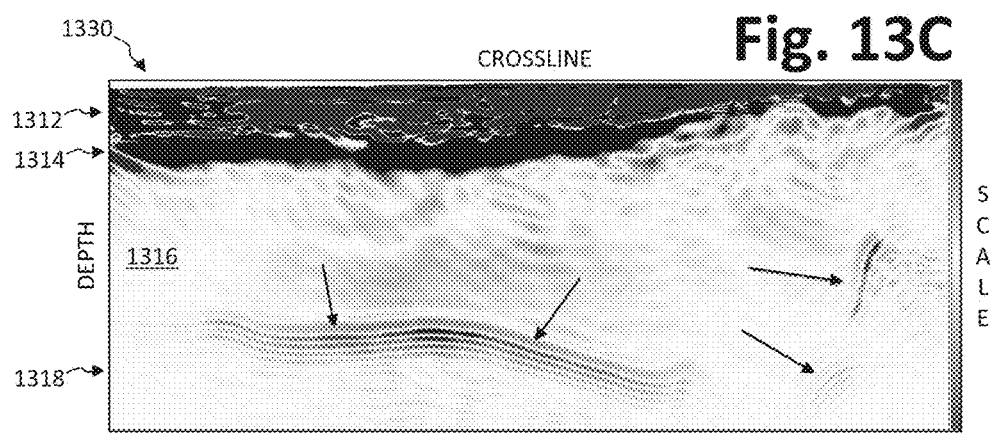
FIG. 13C is a first velocity gradient for the subsurface geology, obtained using reconstructed waveform inversion.

FIG. 13C is a first velocity gradient plot 1330 obtained using reconstructed waveform inversion (RFWI), as described herein. As shown in FIG. 13A, there is a substantial distinction between the water column 1312 and sediment 1314 along the crossline direction, as well as a substantially more clear indication of the transition to the salt formation 1316. The transition to the underlying rock formation 1318 is also more apparent, not only along the generally horizontal portion of the transition in the middle of the figure, but also along the more vertical transition features toward the right-hand side (see arrows).

EXAMPLES

In various examples and embodiments, methods for processing seismic waveform data are provided. The seismic waveform data may be acquired by a set of seismic nodes or receivers, or other seismic survey apparatus. The method may comprise one or more data processing steps according to any combination of the transformations, equations, and inversion techniques described herein.

Depending on embodiment, the seismic data processing method may comprise generating one or more of a true velocity model, an initial model or an inverted model based on the processing steps performed on the seismic waveform data. The method may further comprise displaying the model, and/or displaying an image of subsurface structure based on the model.

A non-transitory computer-readable storage medium can be provided with program code stored thereon, the program code executable on a computer processor to perform a method or processing seismic data according to any of the above examples and embodiments. A computer processing system or apparatus may be adapted for processing the seismic waveform data according to such a method, for example with the computer system or apparatus configured to execute the program code.

In any of these examples and embodiments, a computer processing apparatus can be configured to process seismic waveform data or other geophysical data acquired by a seismic survey system. For example, the computer processing apparatus may be coupled in data communication with such a seismic survey system, which in turn is configured to acquire or generate the seismic data. Alternatively, the computer processing apparatus may be comprised within the seismic survey system, for example using a shipboard navigation system or other processing apparatus in communication with the seismic data acquisition system via a wired or wireless communication link.

Suitable methods can comprise: forward propagating a source signal based on a current model of a subsurface region to generate a forward-propagated wavefield in a time domain; generating a residual based on the forward-propagated wavefield in comparison to field data, wherein the field data are responsive to reflection of the source signal from the subsurface region; back propagating the residual to generate a reconstructed source perturbation in the time domain, based on the current model, and adding the reconstructed source perturbation to the source signal to generate a reconstructed source wavefield; forward propagating the reconstructed source perturbation to generate a reconstructed wavefield perturbation in the time domain, based on the current model, and adding the reconstructed wavefield perturbation to the forward-propagated wavefield to generate a reconstructed forward-propagated wavefield; updating the current model based on the reconstructed forward-propagated wavefield and the reconstructed source perturbation; and generating an image of the subsurface region based on the updated model.

In particular examples and embodiments, generating the reconstructed source wavefield can be performed by minimizing a function of a reconstructed forward-propagated source wavefield while the current model is held constant or kept unchanged, e.g., using a reconstructed forward-propagated source signature or source signal. The method may further comprise: back propagating the reconstructed source perturbation based on the current model; and further updating the current model based on the forward-propagated wavefield and a back-propagated reconstructed wavefield perturbation, wherein both the forward and back propagating are performed in the time domain.

In any of the above examples and embodiments, the model may comprise one or more seismic parameters characterizing the subsurface region and further comprising generating an objective function based on the one or more seismic parameters, the reconstructed source wavefield and the field data. Generating the reconstructed source wavefield can comprise generating a first gradient of the objective function with respect to the reconstructed source wavefield using a fixed current model and minimizing the objective function based on the first gradient. Updating the current model can further comprise generating a second gradient of the objective function with respect to one or more of the seismic parameters using a fixed reconstructed source wavefield and minimizing the objective function based on the second gradient. Generating the reconstructed source wavefield and updating the current model can comprise joint minimization of the objective function based on the first and second gradients.

In any of the above examples and embodiments, the field data can be acquired by an array of seismic sensors responsive to the source signal via reflection from the subsurface region, each of the seismic sensors comprising one or more hydrophones or geophones coupled to a seismic medium through which the source signal propagates. The method can further comprising one or more of: deploying the array of seismic sensors with respect to the seismic medium; firing one or more sources to generate the source signal propagating through the seismic medium; and acquiring the field data, wherein the field data are responsive to the subsurface region based on the reflection of the source signal.

Suitable methods for seismic imaging also comprise: forward propagating a source signature through an earth model of a subsurface structure to generate a forward-propagated wavefield in a time domain; generating a residual by comparing the forward-propagated wavefield to field data obtained at a plurality of receiver locations, wherein the field data are responsive to reflection of the source signature from the subsurface structure; back propagating the residual through the earth model to generate a reconstructed source perturbation in the time domain; adding the reconstructed source perturbation to the source signature to generate a reconstructed source wavefield; forward propagating the reconstructed source perturbation in the time domain based on the earth model to generate a reconstructed wavefield perturbation and adding the reconstructed wavefield perturbation to the forward-propagated wavefield to generate a reconstructed forward-propagated wavefield; updating the earth model based on the reconstructed forward-propagated wavefield and the reconstructed source perturbation, wherein the forward propagating and back propagating are performed in the time domain; and generating a seismic image characterizing the subsurface structure, based on the updated earth model.

In any of the above examples and embodiments, the method can further comprise generating a comparison between the field data and the reconstructed forward-propagated wavefield by projecting the reconstructed forward-propagated wavefield onto the receiver locations, wherein updating the earth model comprises minimizing an objective function based the comparison and a wave equation error with the reconstructed source wavefield held constant or kept unchanged. Minimizing the objective function can comprise generating a first gradient of the objective function with respect to the reconstructed source wavefield. Minimizing the objective function can further comprise generating a second gradient of the objective function with respect to one or more seismic parameters characterizing the subsurface structure. For example, the seismic parameters can comprise one or more of velocity, density, anisotropy and attenuation.

Any of the above methods can also comprise back propagating the reconstructed source perturbation through the earth model and further updating the earth model based on the forward-propagated wavefield and a back-propagated reconstructed wavefield perturbation, wherein the forward and backward propagating are performed in the time domain. Generating the residual can comprise perturbing the source signature to generate a perturbed source wavefield and determining the residual based on propagating the perturbed source wavefield through the earth model in the time domain. The methods can further comprising iterating the method such that the earth model converges toward a physical model of the subsurface structure.

A non-transitory machine readable data storage medium can have program code stored thereon, the program code executable on a computer processor to perform a method comprising: forward propagating a source signature through an earth model of a subsurface region, in a time domain to generate a forward-propagated wavefield; generating a residual by comparing the forward-propagated wavefield to field data responsive to the source signature reflected from the subsurface region; generating a reconstructed source perturbation by back propagating the residual through the earth model in the time domain and generating a reconstructed source wavefield by adding the perturbed source wavefield to the source signature; generating a reconstructed wavefield by forward propagating the reconstructed source perturbation through the earth model in the time domain and adding to the forward-propagated wavefield; generating an objective function by comparing the reconstructed wavefield to the field data and evaluating a wave equation error; updating the earth model by minimizing the objective function with respect to one or more seismic parameters characterizing the earth model of the subsurface region while the reconstructed source wavefield is held constant or kept unchanged; and generating an image of the subsurface region based on the updated earth model.

In any of the above examples and embodiments, updating the earth model can further comprise minimizing the objective function with respect to the reconstructed source wavefield while one or more of the seismic parameters is held constant or kept unchanged. The seismic parameters can comprise one or more of velocity, density, anisotropy and attenuation, for example where the method is performed iteratively such that earth model converges toward a physical model of the seismic parameters in the subsurface region.

While the foregoing is directed to representative embodiments of the present invention, other examples and further embodiments can be devised without departing from the basic scope thereof, as is determined by the claims that follow. The invention is thus described with respect to particular exemplary embodiments, but it is understood that changes can be made and equivalents may be substituted to adapt the disclosure to different problems and application, while remaining within the spirit and scope of the invention as claimed. The invention is thus not limited to the specific examples that are described, but encompasses all embodiments falling within the scope of the appended claims.

The invention claimed is:

1. A method for seismic imaging comprising:
forward propagating a source signal based on a current model of a subsurface region to generate a forward-propagated wavefield in a time domain;
generating a residual based on the forward-propagated wavefield in comparison to field data, wherein the field data are acquired by an array of seismic sensors responsive to reflection of the source signal propagating from the subsurface region through a seismic medium;
back propagating the residual to generate a reconstructed source perturbation in the time domain, based on the current model, and adding the reconstructed source perturbation to the source signal to generate a reconstructed source wavefield;
forward propagating the reconstructed source perturbation to generate a reconstructed wavefield perturbation in the time domain, based on the current model, and adding the reconstructed wavefield perturbation to the forward-propagated wavefield to generate a reconstructed forward-propagated wavefield;
updating the current model based on the reconstructed forward-propagated wavefield and the reconstructed source perturbation; and
generating a seismic image of the subsurface region based on the updated model.

2. The method of claim 1, wherein generating the reconstructed the source wavefield is performed by minimizing a function of a reconstructed forward-propagated source wavefield while the current model is held constant or kept unchanged.

3. The method of claim 1, further comprising:
back propagating the reconstructed source perturbation based on the current model; and
further updating the current model based on the forward-propagated wavefield and a back-propagated reconstructed wavefield perturbation, wherein both the forward and back propagating are performed in the time domain.

4. The method of claim 1, wherein the model comprises one or more seismic parameters characterizing the subsurface region and further comprising generating an objective function based on the one or more seismic parameters, the reconstructed source wavefield and the field data.

5. The method of claim 4, wherein generating the reconstructed source wavefield comprises generating a first gradient of the objective function with respect to the reconstructed source wavefield using a fixed current model and minimizing the objective function based on the first gradient.

6. The method of claim 5, wherein updating the current model further comprises generating a second gradient of the objective function with respect to one or more of the seismic parameters using a fixed reconstructed source wavefield and minimizing the objective function based on the second gradient.

7. The method of claim 6, wherein generating the reconstructed source wavefield and updating the current model comprise joint minimization of the objective function based on the first and second gradients.

8. The method of claim 1, wherein each of the seismic sensors comprises one or more hydrophones or geophones coupled to the seismic medium through which the source signal propagates.

9. The method of claim 8, further comprising one or more of:
deploying the array of seismic sensors with respect to the seismic medium;
firing one or more sources to generate the source signal propagating through the seismic medium; and
acquiring the field data, wherein the field data are responsive to the subsurface region based on the reflection of the source signal.

10. A method for seismic imaging, the method comprising:
forward propagating a source signature through an earth model of a subsurface structure to generate a forward-propagated wavefield in a time domain;
generating a residual by comparing the forward-propagated wavefield to field data obtained by an array of seismic sensors at a plurality of seismic receiver locations, wherein the field data are responsive to reflection of the source signature propagating from the subsurface structure through a seismic medium;
back propagating the residual through the earth model to generate a reconstructed source perturbation in the time domain;
adding the reconstructed source perturbation to the source signature to generate a reconstructed source wavefield;
forward propagating the reconstructed source perturbation in the time domain based on the earth model to generate a reconstructed wavefield perturbation and adding the reconstructed wavefield perturbation to the forward-propagated wavefield to generate a reconstructed forward-propagated wavefield;
updating the earth model based on the reconstructed forward-propagated wavefield and the reconstructed source perturbation, wherein the forward propagating and back propagating are performed in the time domain; and
generating a seismic image characterizing the subsurface structure, based on the updated earth model.

11. The method of claim 10, further comprising generating a comparison between the field data and the reconstructed forward-propagated wavefield by projecting the reconstructed forward-propagated wavefield onto the receiver locations, wherein updating the earth model comprises minimizing an objective function based the comparison and a wave equation error with the reconstructed source wavefield held constant or kept unchanged.

12. The method of claim 11, wherein minimizing the objective function comprises generating a first gradient of the objective function with respect to the reconstructed source wavefield.

13. The method of claim 12, wherein minimizing the objective function further comprises generating a second gradient of the objective function with respect to one or more seismic parameters characterizing the subsurface structure.

14. The method of claim 13, wherein the seismic parameters comprise one or more of velocity, density, anisotropy and attenuation.

15. The method of claim 10, further comprising back propagating the reconstructed source perturbation through the earth model and further updating the earth model based on the forward-propagated wavefield and a back-propagated reconstructed wavefield perturbation, wherein the forward and backward propagating are performed in the time domain.

16. The method of claim 10, wherein generating the residual comprises perturbing the source signature to generate a perturbed source wavefield and determining the residual based on propagating the perturbed source wavefield through the earth model in the time domain.

17. The method of claim 10, further comprising iterating the method such that the earth model converges toward a physical model of the subsurface structure.

18. A non-transitory machine readable data storage medium having program code stored thereon, the program code executable on a computer processor to perform a method comprising:
   forward propagating a source signature through an earth model of a subsurface region, in a time domain to generate a forward-propagated wavefield;
   generating a residual by comparing the forward-propagated wavefield to field data acquired by an array of seismic sensors responsive to the source signature reflected from the subsurface region and propagating through a seismic medium;
   generating a reconstructed source perturbation by back propagating the residual through the earth model in the time domain and generating a reconstructed source wavefield by adding the perturbed source wavefield to the source signature;
   generating a reconstructed wavefield by forward propagating the reconstructed source perturbation through the earth model in the time domain and adding to the forward-propagated wavefield;
   generating an objective function by comparing the reconstructed wavefield to the field data and evaluating a wave equation error;
   updating the earth model by minimizing the objective function with respect to one or more seismic parameters characterizing the earth model of the subsurface region while the reconstructed source wavefield is held constant or kept unchanged; and
   generating a seismic image of the subsurface region based on the updated earth model.

19. The non-transitory machine-readable data storage medium of claim 18, wherein updating the earth model further comprises minimizing the objective function with respect to the reconstructed source wavefield while one or more of the seismic parameters is held constant or kept unchanged.

20. The non-transitory machine-readable data storage medium of claim 18, wherein the seismic parameters comprise one or more of velocity, density, anisotropy and attenuation and the method is performed iteratively such that earth model converges toward a physical model of the seismic parameters in the subsurface region.

* * * * *